United States Patent [19]
Matsumoto et al.

[11] Patent Number: 5,575,267
[45] Date of Patent: Nov. 19, 1996

[54] FAULT DIAGNOSIS APPARATUS FOR A FUEL EVAPORATIVE EMISSION SUPPRESSING SYSTEM

[75] Inventors: Takuya Matsumoto; Toru Hashimoto; Mitsuhiro Miyake; Hitoshi Kamura, all of Kyoto, Japan; Yasuhisa Yoshida, Corella Newport Beach, Calif.; Hidetsugu Kanao; Toshiro Nomura, both of Okazaki, Japan

[73] Assignee: Mitsubishi Jidosha Kogyo Kabushiki Kaisha, Tokyo, Japan

[21] Appl. No.: 537,293

[22] Filed: Sep. 29, 1995

[30] Foreign Application Priority Data

Sep. 30, 1994 [JP] Japan ..................... 6-237427
Sep. 30, 1994 [JP] Japan ..................... 6-237429
Sep. 30, 1994 [JP] Japan ..................... 6-237430
Jan. 20, 1995 [JP] Japan ..................... 7-007764

[51] Int. Cl.⁶ .................. F02D 41/00; F02M 33/02
[52] U.S. Cl. ........................... 123/698; 123/519
[58] Field of Search ..................... 123/698, 519, 123/520, 198 D, 518

[56] References Cited

U.S. PATENT DOCUMENTS

| | | | |
|---|---|---|---|
| 4,962,744 | 10/1990 | Uranishi et al. | 123/519 |
| 5,150,686 | 9/1992 | Okawa et al. | 123/698 |
| 5,150,689 | 9/1992 | Yano et al. | 123/519 |
| 5,158,059 | 10/1992 | Kuroda | 123/690 |
| 5,178,117 | 1/1993 | Fujimoto et al. | 123/520 |
| 5,193,512 | 3/1993 | Steinbrenner et al. | 123/519 |
| 5,224,462 | 7/1993 | Orzel | 123/696 |
| 5,230,319 | 7/1993 | Otsuka et al. | 123/519 |
| 5,243,307 | 6/1995 | Okawa et al. | 123/698 |

*Primary Examiner*—Raymond A. Nelli
*Attorney, Agent, or Firm*—Birch, Stewart, Kolasch & Birch, LLP.

[57] ABSTRACT

A fault diagnosis apparatus for detecting a fault in a fuel evaporative emission suppressing system comprises an electronic control unit. When fault diagnosis execution conditions are fulfilled, the electronic control unit stores an average of integral term values for air-fuel ratio feedback control, operating position of an idling speed control valve, and engine speed, and then actuates a purge control valve of the suppressing system so that the valve opens. In a predetermined time period after the actuation of the purge control valve, the integral term average and the like are stored again. If any changes of the integral term average and other values caused by the actuation of the purge control valve are detected, the suppressing system is concluded to be normal. If no changes are detected, on the other hand, the suppressing system is concluded to be faulty.

25 Claims, 12 Drawing Sheets

FAULT DIAGNOSIS APPARATUS FOR A FUEL EVAPORATIVE EMISSION SUPPRESSING SYSTEM

BACKGROUND OF THE INVENTION

1. Field of the Invention

The present invention relates to a fault diagnosis apparatus for a fuel evaporative emission suppressing system.

2. Description of the Related Art

In order to prevent air pollution and the like, the engine and body of an automobile are provided with various devices for treating harmful emission components. These known devices include, for example, a blow-by gas recirculating device for guiding a blow-by gas, which consists mainly of an unburned fuel component (HC) leaking from a combustion chamber of the engine into a crank case, to an intake pipe, and a fuel evaporative emission suppressing device for guiding a fuel evaporative gas, composed mainly of HC produced in a fuel tank, into the intake pipe.

The fuel evaporative emission suppressing device comprises a canister, loaded with activated charcoal which adsorbs the fuel evaporative gas, a large number pipes, etc. The canister is provided with an inlet port, outlet port, and vent port which open into the fuel tank, intake pipe, and atmosphere, respectively. In the fuel evaporative emission suppressing device of this canister-storage type, the fuel evaporative gas in the fuel tank is introduced into the canister and made to be adsorbed by the activated charcoal. The atmosphere (purge air) is introduced into the canister through the vent port by applying a negative pressure in the intake pipe to the outlet port. The fuel evaporative gas adsorbed by the activated charcoal is separated therefrom by means of the purge air, and the separated gas, along with the purge air, is introduced into the intake pipe. The fuel evaporative gas, thus delivered into the intake pipe, is burned in the combustion chamber of the engine, whereby it is prevented from being discharged into the atmosphere.

If the purge air containing the fuel evaporative gas is introduced carelessly into the intake pipe, however, the air-fuel ratio of an air-fuel mixture deviates from its appropriate range, so that the rotational speed and output torque of the engine fluctuate greatly. Accordingly, the comfortableness to drive or drivability of the vehicle worsens. This unfavorable phenomenon is particularly remarkable in the case where the purge air is introduced while the engine is running in an idling area in which the quantity of intake air is small.

To avoid this, a purge control valve, for use as purge regulating means for controlling the rate of purge air introduction, is provided in a purge passage which connects the canister and the intake pipe. The purge control valve is opened to allow the purge air to be introduced into the engine only when the engine is operating in a predetermined operation area. In general, purge control valves may be classified into two types, mechanical ones which operate in response to negative intake pressure and electrical ones which are controlled in on-off operation by means of an electronic control unit (ECU) in accordance with pieces of operation information, such as the throttle opening, intake air flow rate, etc. Although the mechanical valves, low-priced, are widely used, the electrical or solenoid-operated valves are superior in performance, since the introduction and shut-off of the purge air can be controlled more accurately and freely by the electrical ones.

In the fuel evaporative emission suppressing device furnished with one such solenoid-operated purge control valve, however, snapping of wires which connect the ECU and the purge control valve, connector contact failure, etc. may occur, or a valve plug in the control valve may possibly be fixed in a closed state from some cause. In such a case, the purge air cannot be introduced into the intake pipe, so that the canister is overloaded with the fuel evaporative gas. Inevitably, therefore, the fuel evaporative gas additionally supplied from the fuel tank is discharged into the atmosphere without being adsorbed by the activated charcoal.

Naturally, however, the discharge of the fuel evaporative gas into the atmosphere constitutes no hindrance to the engine operation. Thus, a driver can hardly be aware of this fault as the fuel evaporative gas continues to be discharged into the atmosphere for a long period of time.

SUMMARY OF THE INVENTION

An object of the present invention is to provide a fault diagnosis apparatus capable of securely detecting a fault or malfunction of a fuel evaporative emission suppressing system.

Another object of the invention is to provide a fault diagnosis apparatus capable of minimizing the deterioration of the comfortableness to drive or drivability of a vehicle which is caused by the execution of a fault diagnosis.

Still another object of the invention is to provide a fault diagnosis apparatus capable of preventing an erroneous diagnosis which may otherwise be caused when a heavy load is applied to an engine or when the engine load is changed.

According to one aspect of the present invention, there is provided a fault diagnosis apparatus for detecting a fault in a fuel evaporative emission suppressing system which includes a purge passage, through which a fuel evaporative gas in a fuel supply system of an engine mounted in a vehicle, along with the outside air, is introduced as purge air into an intake passage of the engine, and purge regulating means for changing the quantity of purge air introduction. This fault diagnosis apparatus comprises operating state change detecting means for detecting a change of the operating state of at least one of the vehicle, engine, and means associated with engine operation when the purge regulating means is driven, and fault diagnosis means for making a fault diagnosis on the fuel evaporative emission suppressing system in accordance with the change of the operating state detected by the operating state change detecting means.

When the purge regulating means of the fuel evaporative emission suppressing system is driven for purge air introduction, the purge air is introduced into a combustion chamber of the engine through the intake passage if the suppressing system is normal. As a result, the engine speed changes, so that there occur changes in the respective operating states of the vehicle, engine, and means associated with engine operation. If the fuel evaporative emission suppressing system is subject to a fault, such as a trouble in the purge regulating means, wire snapping, or connector contact failure, on the other hand, the purge air cannot be introduced, so that the operating states never change.

An advantage of the fault diagnosis apparatus of the invention lies in that the fault diagnosis can be accurately made on the fuel evaporative emission suppressing system, especially on the purge regulating means thereof, in accordance with the presence/absence of a change of the operating state which is caused as the purge regulating means is driven.

The fault diagnosis apparatus may be provided in the fuel evaporative emission suppressing system attached to the engine which has, in the intake passage thereof, intake air quantity regulating means for adjusting the quantity of air sucked into the engine, thereby keeping the engine speed constant. Preferably, in this case, the operating state change detecting means detects the change of the manipulated variable of the intake air quantity regulating means as the operating state change.

When the purge regulating means is driven, the purge air is introduced if the fuel evaporative emission suppressing system is normal. The intake air quantity regulating means operates so as to compensate for the change of the engine speed which accompanies the purge air introduction. Thus, the manipulated variable of the intake air quantity regulating means changes. If the suppressing system is faulty, on the other hand, the purge air is not introduced, so that the manipulated variable of the intake air quantity regulating means never changes.

An advantage of this preferred embodiment lies in that the presence/absence of a fault in the fuel evaporative emission suppressing system can be securely detected in accordance with the presence/absence of the change of the manipulated variable of the intake air quantity regulating means even when the engine speed is kept constant by operating the intake air quantity regulating means.

In the fault diagnosis apparatus, moreover, the change of the engine speed itself may be detected as the operating state change by using the operating state change detecting means.

If the fuel evaporative emission suppressing system is normal, the purge air is introduced, so that the engine speed changes. If the suppressing system is faulty, on the other hand, the engine speed never changes. An advantage of this preferred embodiment lies in that the fault diagnosis on the fuel evaporative emission suppressing system can be directly made in accordance with the change of the engine speed itself.

Alternatively, the fault diagnosis apparatus may be provided in the fuel evaporative emission suppressing system attached to the engine which includes air-fuel ratio detecting means for detecting the air-fuel ratio of an air-fuel mixture supplied to the engine, control correction value setting means for setting a control correction value for air-fuel ratio feedback control in accordance with the result of the detection by the air-fuel ratio detecting means, fuel supply regulating means for adjusting the quantity of fuel supply to the engine, and fuel control means for drivingly controlling the fuel supply regulating means in accordance with the control correction value set by the control correction value setting means.

Preferably, in this case, the operating state change detecting means detects the control correction value set by the control correction value setting means. Also, the fault diagnosis means includes first fault diagnosis sub-means for making a fault diagnosis on the fuel evaporative emission suppressing system in accordance with the change of the control correction value caused when the purge regulating means is driven.

If the fuel evaporative emission suppressing system is normal, the purge air is introduced, so that the air-fuel ratio of the air-fuel mixture changes to the rich or lean side. In order to reduce this change of the air-fuel ratio, the control correction value for air-fuel ratio feedback is changed from a value obtained when the purge air is not introduced. If the suppressing system is faulty, on the other hand, the purge air is not introduced, so that the control correction value is not changed.

An advantage of this preferred embodiment lies in that the fault diagnosis on the fuel evaporative emission suppressing system can be accurately made in accordance with the occurrence of the change of the control correction value caused when the purge regulating means is driven.

Preferably, the first fault diagnosis sub-means concludes that the fuel evaporative emission suppressing system is faulty when the deviation between a control correction value detected before the purge regulating means is driven and a control correction value detected while the purge regulating means is being driven is smaller than a predetermined value. In this case, the sensitivity of the fault diagnosis can be appropriately adjusted by properly setting the predetermined value.

Further preferably, the first fault diagnosis sub-means makes a fault diagnosis on the fuel evaporative emission suppressing system in accordance with an average of control correction values obtained from control correction values detected individually before the purge regulating means is driven and an average of control correction values obtained from control correction values detected individually while the purge regulating means is being driven. An advantage of this preferred embodiment lies in that the influence of the change of the control correction value on the fault diagnosis can be removed to improve the accuracy of the diagnosis even in the case where the control correction value varies as the air-fuel ratio feedback control is executed.

Moreover, the fault diagnosis apparatus which comprises the first fault diagnosis sub-means may be provided in the fuel evaporative emission suppressing system attached to the engine which has, in the intake passage thereof, intake air quantity regulating means for adjusting the quantity of air sucked into the engine, thereby keeping the engine speed constant.

Preferably, in this case, the operating state change detecting means detects the change of the manipulated variable of the intake air quantity regulating means as the operating state change. Also, the fault diagnosis means includes second fault diagnosis sub-means for making a fault diagnosis on the fuel evaporative emission suppressing system in accordance with the change of the manipulated variable of the intake air quantity regulating means. Further, the fault diagnosis means finally concludes that the fuel evaporative emission suppressing system is faulty only when both the first and second fault diagnosis sub-means detect a fault in the suppressing system.

An advantage of this preferred embodiment lies in that the fuel evaporative emission suppressing system is concluded to be faulty only in the case where the intake air quantity regulating means does not operate and the control correction value does not change when the purge regulating means is driven. Thus, the possibility of an erroneous diagnosis can be reduced to a very low level.

Preferably, in the fault diagnosis apparatus which comprises the first fault diagnosis sub-means, the operating state change detecting means detects the change of the engine speed itself as the operating state change. Also, the fault diagnosis means includes second fault diagnosis sub-means for making a fault diagnosis on the fuel evaporative emission suppressing system in accordance with the change of the engine speed. Further, the fault diagnosis means finally concludes that the fuel evaporative emission suppressing system is faulty only when both the first and second fault diagnosis sub-means detect a fault in the suppressing system.

An advantage of this preferred embodiment lies in that the fuel evaporative emission suppressing system is concluded to be faulty only in the case where the engine speed and the control correction value do not change when the purge regulating means is driven. Thus, the possibility of an erroneous diagnosis can be reduced to a very low level.

According to another aspect of the present invention, there is provided a fault diagnosis apparatus for detecting a fault in a fuel evaporative emission suppressing system which includes a purge passage, through which a fuel evaporative gas in a fuel supply system of an engine mounted in a vehicle, along with the outside air, is introduced as purge air into an intake passage of the engine, and purge regulating means for changing the quantity of purge air introduction. This fault diagnosis apparatus comprises operating state detecting means for detecting the operating state of at least one of the vehicle, engine, and means associated with engine operation, diagnosis means for making a fault diagnosis on the fuel evaporative emission suppressing system in accordance with the change of the operating state of the at least one of the vehicle, engine, and the means associated with engine operation when the purge regulating means is driven, and diagnosis prohibiting means adapted to interrupt the diagnosis by the diagnosis means when the operating state detected by the operating state detecting means fulfills a predetermined diagnosis interruption condition while the diagnosis means is making the diagnosis and to prohibit the diagnosis means from starting the diagnosis during a predetermined time period after the interruption of the diagnosis.

An advantage of this fault diagnosis apparatus lies in that the fault diagnosis is interrupted when the engine is accelerated during the execution of the fault diagnosis, for example, so that the fault diagnosis interruption condition is fulfilled, and that the start of the diagnosis is prohibited during the predetermined time period after the interruption of the diagnosis. When the vehicle is running in an urban district where it frequently repeats start and stop, for example, therefore, the fault diagnosis execution intervals are longer, and the frequencies of occurrence of the increase of the engine speed and the fluctuation of the engine output torque caused by the purge air introduction for fault diagnosis can be lowered. Thus, worsening of the comfortableness to drive or drivability of the vehicle can be prevented.

Moreover, the fault diagnosis apparatus may be provided in the fuel evaporative emission suppressing system attached to the engine which has, in the intake passage thereof, intake air quantity regulating means for adjusting the quantity of air sucked into the engine, thereby keeping the engine speed constant.

Preferably, in this case, the purge regulating means includes a purge regulating valve provided in the purge passage and adapted to open and close, thereby adjusting the flow rate of the purge air. Also, the diagnosis means includes manipulated variable detecting means for detecting the manipulated variable of the intake air quantity regulating means. Further, the diagnosis means makes a fault diagnosis on the fuel evaporative emission suppressing system in accordance with the change of the manipulated variable obtained from manipulated variable values detected by the manipulated variable detecting means when the purge regulating valve is driven so as to be opened and closed, individually.

When the purge regulating valve is driven so as to be opened, according to this preferred embodiment, the purge air is introduced if the fuel evaporative emission suppressing system is normal, and the intake air quantity regulating means operates so as to compensate for the change of the engine speed which accompanies the purge air introduction. Thus, the manipulated variable of the intake air quantity regulating means changes. If the suppressing system is faulty, on the other hand, the purge regulating valve does not open. Accordingly, the purge air is not introduced, so that the manipulated variable of the intake air quantity regulating means never changes. An advantage of this preferred embodiment lies in that the presence/absence of a fault in the fuel evaporative emission suppressing system can be securely detected in accordance with the presence/absence of the change of the manipulated variable of the intake air quantity regulating means even when the engine speed is kept constant by operating the intake air quantity regulating means.

Preferably, the diagnosis means prohibits the start of a new diagnosis during a predetermined time period after the detection of a fault in the case where it is concluded that the fuel evaporative emission suppressing system is faulty. An advantage of this preferred embodiment lies in that the fault diagnosis execution intervals can be made longer in rerunning the fault diagnosis on the suppressing system after once detecting the occurrence of the fault in the suppressing system. Thus, the frequencies of occurrence of the increase of the engine speed and the torque fluctuation caused by the purge air introduction for fault diagnosis can be lowered, so that worsening of the comfortableness to drive or drivability of the vehicle can be prevented.

According to still another aspect of the present invention, there is provided a fault diagnosis apparatus for detecting a fault in a fuel evaporative emission suppressing system which includes a purge passage, through which a fuel evaporative gas in a fuel supply system of an engine mounted in a vehicle, along with the outside air, is introduced as purge air into an intake passage of the engine, and purge regulating means for changing the quantity of purge air introduction. This fault diagnosis apparatus comprises diagnosis means for making a fault diagnosis on the fuel evaporative emission suppressing system in accordance with the change of the operating state of at least one of the vehicle, engine, and means associated with engine operation when the purge regulating means is driven, load detecting means for detecting the engine load, and diagnosis interrupting means for interrupting the fault diagnosis by the diagnosis means when a predetermined loaded state of the engine is detected by the load detecting means.

When the purge regulating means is driven so as to introduce the purge air, according to this fault diagnosis apparatus, the purge air is introduced into the intake passage of the engine if the fuel evaporative emission suppressing system is normal. As a result, the engine operating state, including conditions such as the air-fuel ratio, speed, etc. change, so that the operating states of the means associated with engine operation, such as the manipulated variable of an ISC (idling speed control) valve, change. Thus, the operating state of the vehicle changes. If the suppressing system is faulty, on the other hand, the operating states never change. Based on the result of detection by the operating state change detecting means, moreover, the fault diagnosis means makes a fault diagnosis on the suppressing apparatus. If the engine load exceeds a predetermined value or is changed during the fault diagnosis, the fault diagnosis by the diagnosis means is interrupted.

An advantage of this fault diagnosis apparatus lies in that an erroneous diagnosis attributable to the change of the engine load can be prevented securely.

Preferably, the load detecting means detects the intake air quantity for each intake stroke of the engine, the volumetric efficiency of the engine, or the manipulated variable of a suction system attached to the engine as the engine load.

In this case, the fault diagnosis by the diagnosis means is interrupted to prevent an erroneous diagnosis when the intake air quantity, volumetric efficiency, or manipulated variable of the suction system is higher than a predetermined value or is greatly changed during the fault diagnosis.

Alternatively, the load detecting means detects the value of the engine load or the change of the engine load, and the diagnosis interrupting means interrupts the fault diagnosis by the diagnosis means when the value of the engine load detected by the load detecting means is greater than a predetermined value or when the change of the engine load is detected by the load detecting means. Thus, an erroneous diagnosis can be prevented.

Alternatively, the load detecting means detects the presence/absence of changeover of the speed range of an automatic transmission provided in the vehicle, and the diagnosis interrupting means interrupts the fault diagnosis by the diagnosis means when changeover between a non-running range and a running range is detected by the load detecting means. In this case, when the engine load is increased as a driver shifts the speed range of the vehicle running at a speed in the range N, for example, to the range D during the execution of the fault diagnosis, the fault diagnosis by the diagnosis means is interrupted, whereby an erroneous diagnosis attributable to the increase of the engine load is prevented.

Alternatively, the load detecting means detects the presence/absence of a change of the operating state of an air conditioner provided in the vehicle, and the diagnosis interrupting means interrupts the fault diagnosis by the diagnosis means when the start or interruption of the operation of the air conditioner is detected by the load detecting means. In this case, an erroneous diagnosis attributable to the increase or decrease of the engine load, which accompanies the start or interruption of the operation of the air conditioner during the fault diagnosis, is prevented.

Alternatively, the load detecting means detects the presence/absence of a change of the operating state of an electrical load provided in the vehicle, and the diagnosis interrupting means interrupts the fault diagnosis by the diagnosis means when the change of the operating state of the electrical load is detected by the load detecting means. In this case, an erroneous diagnosis attributable to the increase or decrease of the engine load, which accompanies the change of the operating states of the electrical load, such as an alternator or head lamps, etc., during the fault diagnosis, is prevented.

Alternatively, the load detecting means detects the presence/absence of a change of the discharge pressure of an engine-operated hydraulic pump of a power steering system provided in the vehicle, and the diagnosis interrupting means interrupts the fault diagnosis by the diagnosis means when the change of the discharge pressure of the hydraulic pump is detected by the load detecting means. An advantage of this preferred embodiment lies in that an erroneous diagnosis attributable to the increase or decrease of the engine load, which accompanies an increase, if any, of the discharge pressure of the hydraulic pump caused by the driver's steering operation during the fault diagnosis, can be prevented.

Further, the fault diagnosis apparatus may be provided in the fuel evaporative emission suppressing system attached to the engine which has air-fuel ratio control means for keeping the air-fuel ratio of an air-fuel mixture supplied to the engine at a predetermined value. Preferably, in this case, the purge regulating means includes a purge regulating valve provided in the purge passage and adapted to open and close, thereby adjusting the flow rate of the purge air, and the diagnosis means includes correction value detecting means for detecting the correction value of the air-fuel ratio corrected by the air-fuel ratio control means. The diagnosis means makes a fault diagnosis in accordance with the change of the correction value obtained from correction values detected by the correction value detecting means when the purge regulating valve is driven so as to be opened and closed, individually.

If the fuel evaporative emission suppressing system is normal, according to this preferred embodiment, when the purge regulating valve is driven so as to be opened or closed, the purge regulating valve is opened or closed to increase or decrease the rate of purge air introduction. Thus, in order to compensate for the purge air introduction rate and hence the change of the air-fuel ratio, which accompany the opening or closing of the purge regulating valve, the air-fuel ratio correction value is changed. If the suppressing system is faulty, the purge air introduction rates and the air-fuel ratio correction value do not change.

An advantage of this preferred embodiment lies in that the occurrence of a fault in the fuel evaporative emission suppressing system can be securely detected in accordance with the change of the air-fuel ratio correction value which accompanies the actuation of the purge regulating valve for opening/closing the same valve.

Furthermore, the fault diagnosis apparatus may be provided in the fuel evaporative emission suppressing system attached to the engine which has, in the intake passage thereof, intake air quantity regulating means for adjusting the quantity of air sucked into the engine, thereby keeping the engine speed constant. Preferably, in this case, the purge regulating means includes a purge regulating valve provided in the purge passage and adapted to open and close, thereby adjusting the flow rate of the purge air, and the diagnosis means includes manipulated variable detecting means for detecting the manipulated variable of the intake air quantity regulating means. The diagnosis means makes a fault diagnosis in accordance with the change of the manipulated variable obtained from manipulated variable values detected by the manipulated variable detecting means when the purge regulating valve is driven so as to be opened and closed, individually.

An advantage of this preferred embodiment lies in that the occurrence of a fault in the fuel evaporative emission suppressing system can be securely detected in accordance with the occurrence of the change of the manipulated variable of the intake air quantity regulating means.

Preferably, the purge regulating means includes a purge regulating valve provided in the purge passage and adapted to open and close, thereby adjusting the flow rate of the purge air, and the diagnosis means includes engine speed detecting means for detecting the engine speed. The diagnosis means makes a fault diagnosis in accordance with the change of the engine speed obtained from engine speeds detected by the engine speed detecting means when the purge regulating valve is driven so as to be opened and closed, individually.

An advantage of this preferred embodiment lies in that the presence/absence of a fault in the fuel evaporative emission suppressing system can be securely detected in accordance with the presence/absence of the change of the engine speed which accompanies the actuation of the purge regulating valve for opening/closing the same valve.

Preferably, the diagnosis interrupting means prohibits the diagnosis means from starting the fault diagnosis during a predetermined time period after the interruption of the diagnosis. An advantage of this preferred embodiment lies in that the fault diagnosis execution intervals can be made longer so that the frequencies of occurrence of the increase of the engine speed and the engine output torque fluctuation, caused by the purge air introduction for fault diagnosis, can be lowered, whereby worsening of the comfortableness to drive or drivability of the vehicle can be prevented.

BRIEF DESCRIPTION OF THE DRAWINGS

The above and other objects, features, and advantages of the invention will be more apparent from the ensuing detailed description taken in connection with the accompanying drawings, in which.

DETAILED DESCRIPTION OF THE PREFERRED EMBODIMENTS

Figure 1:
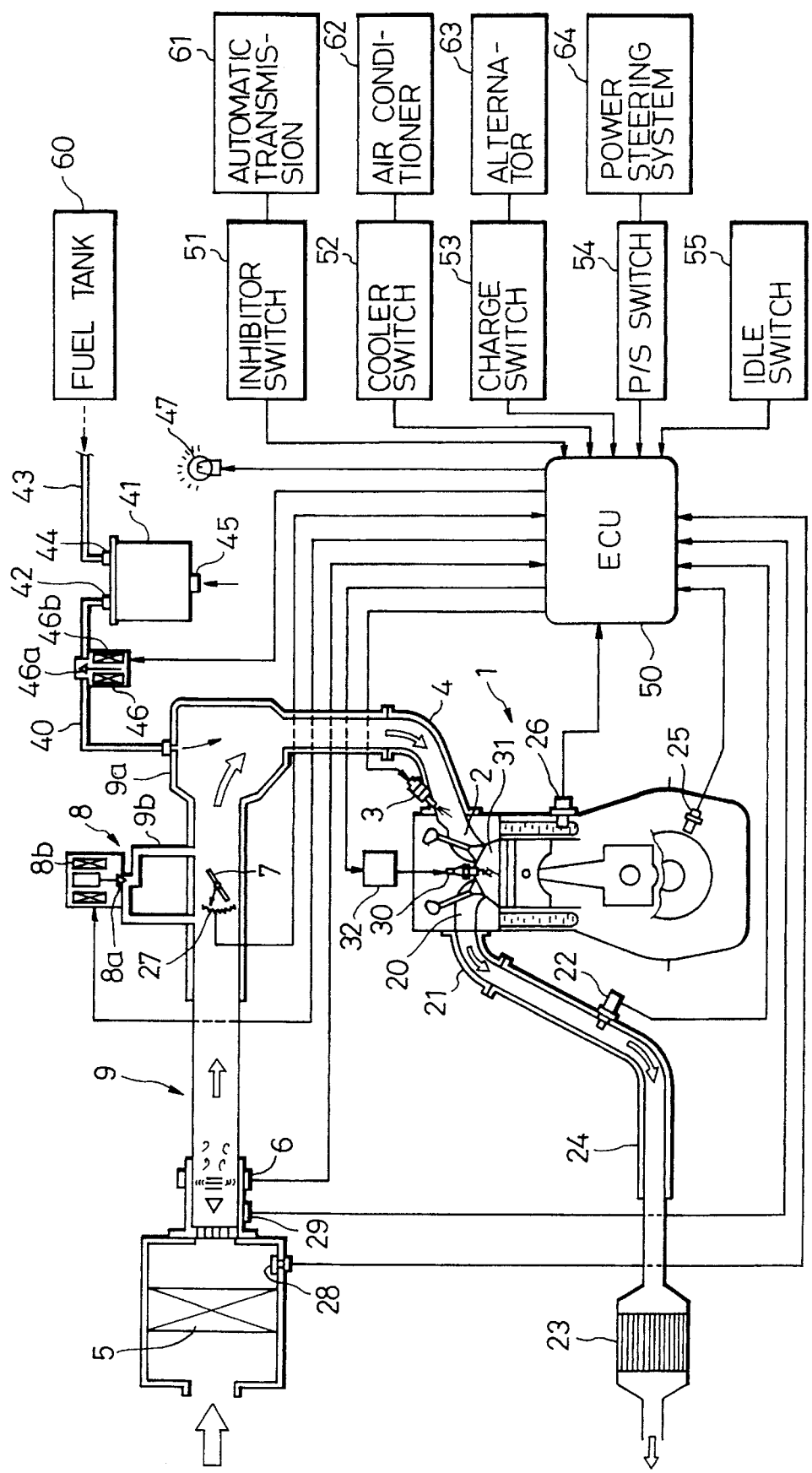
FIG. 1 is a diagram showing an engine control system furnished with a fault diagnosis apparatus according to a first embodiment of the present invention.

Referring now to FIG. 1, a fault diagnosis apparatus according to a first embodiment of the present invention, which is provided in a fuel evaporative emission suppressing system attached to an engine, will be described in detail.

In FIG. 1, numeral 1 denotes an automotive engine, e.g., a four-cylinder in-line gasoline engine. An intake manifold 4 is connected to an intake port 2 of the engine 1, and is provided with a fuel injection valve 3 for each cylinder. An intake pipe 9, which is connected to the intake manifold 4 through a surge tank 9a for intake pulsation prevention, is provided with an air cleaner 5 and a throttle valve 7. A bypass line 9b for by-passing the throttle valve 7 is provided with an idling speed control (ISC) valve 8 as intake air regulating means which adjusts the quantity of air sucked into the engine 1 through the by-pass line 9b. The ISC valve 8 includes a valve plug 8a for increasing or reducing the flow area of the by-pass line 9b and a stepping motor 8b for driving the valve plug 8a to cause the same to open and close.

An exhaust manifold 21 is connected to an exhaust port 20 of the engine 1, and a muffler (not shown) is connected to the manifold 21 through an exhaust pipe 24 and a three-way catalyst 23. Numerals 30 and 32 denote, respectively, a spark plug for igniting an air-fuel mixture fed into a combustion chamber 31 through the intake port 2 and an ignition unit connected to the plug 30.

Further, the engine 1 is furnished with an fuel evaporative emission suppressing system for preventing the emission of a fuel evaporative gas produced in a fuel tank 60 (fuel supply system in general).

The fuel evaporative emission suppressing system includes a canister 41 loaded with activated charcoal which adsorbs the fuel evaporative gas. The canister 41 is formed with a purge port 42, which communicates with the surge tank 9a of the engine 1 by means of a purge pipe (purge passage) 40, an inlet port 44, which communicates with the fuel tank 60 by means of an inlet pipe 43, and a vent port 45 which opens into the atmosphere. The purge pipe 40 is provided with a purge control valve 46 for use as purge regulating means (purge regulating valve).

The control valve 46 is composed of a normally-open solenoid valve which includes a valve plug 46a for opening and closing the purge pipe 40, a spring (not shown) for urging the plug 46a in the valve closing direction, and a solenoid 46b which is connected electrically to an electronic control unit (ECU) 50. The control valve 46, which is turned on and off by means of the ECU 50, opens when its solenoid 46b is de-energized, and closes when the solenoid 46b is energized.

When the control valve 46 is opened, an intake negative pressure acts on the purge port 42, and the atmosphere flows into the canister 41 through the vent port 45. As the atmosphere is introduced in this manner, the fuel component of the fuel evaporative gas, having so far been adsorbed by the canister 41, leaves the canister 41, and as purge air, flows together with the atmosphere into the surge tank 9a. When the control valve 46 is closed, on the other hand, the introduction of the purge air is prevented.

The fuel evaporative emission suppressing system is furnished with a fault diagnosis apparatus which includes operating state detecting means for detecting the operating states of the vehicle, engine 1, and various means associated with engine operation. The operating state detecting means includes various sensors and switches, which will be described below. Most of the sensors and switches are also used for conventional engine operation control.

In FIG. 1, numeral 6 denotes an airflow sensor of the Karman-vortex type attached to the intake pipe 9 and used to detect the quantity of intake air; 22, an $O_2$ sensor (air-fuel ratio detecting means) for detecting the oxygen concentration of exhaust gas flowing in the exhaust pipe 24; and 25, a crank angle sensor which, including an encoder drivingly coupled with a camshaft of the engine 1, generates crank angle synchronous signals. Numerals 26 and 27 denote a water temperature sensor for detecting an engine cooling water temperature $T_W$ and a throttle sensor for detecting an opening $\theta_{TH}$ of a throttle valve 7, respectively. Further, numerals 28 and 29 denote an atmospheric pressure sensor for detecting the atmospheric pressure Pa and an intake air temperature sensor for detecting an intake air temperature Ta, respectively.

Numerals 51 to 54 denote a group of switches which function as engine load detecting means. An inhibitor switch 51 is associated with a selector lever of an automatic transmission 61, and detects the speed range of the automatic transmission 61. A cooler switch 52 is associated with a magnet clutch of a cooler compressor of an air conditioner 62, and detects the operating state of the air conditioner 62. A charge switch 53 is associated with an alternator 63 for use as an electricity generator, and detects the state of electricity generation of the alternator 63. A P/S switch 54 is associated with a power steering pump of a power steering (P/S) system 64, and detects the discharge pressure of hydraulic oil from the pump. Numeral 55 denotes an idle switch which is turned on when throttle valve 7 is in its idle position (substantially fully closed position).

Further, the fault diagnosis apparatus includes the electronic control unit (ECU) 50 as fault diagnosis means which checks the fuel evaporative emission suppressing system for a fault in accordance with changes of the operating states detected by means of the sensors 6, 22, and 25 to 29 and the switches 51 to 55. The ECU 50 also serves as means associated with the engine operation and, in conjunction with the sensors and the switches, functions as operating state change detecting means.

The ECU 50 includes input and output devices, memories (ROM, RAM, nonvolatile RAM, etc.) stored with various control programs and the like, central processing unit (CPU), timer, etc., none of which are shown in FIG. 1. The sensors 6, 22, and 25 to 29 and the switches 51 to 55 are connected electrically to the input side of the ECU 50, while the stepping motor 8b of the ISC valve 8, the solenoid 46b of the control valve 46, a warning lamp 47 are connected electrically to the output side of the ECU 50. The warning lamp 47 is attached to an instrument panel of the vehicle and serves to warn a driver of a fault in the control valve 46.

The ECU 50 calculates an engine rotational speed $N_E$ according to the generation time interval of the crank angle synchronous signals delivered from the crank angle sensor 25. Thus, the ECU 50, in conjunction with the crank angle sensor 25, constitutes engine speed detecting means. Also, the ECU 50 calculates an intake air quantity (A/N) for each intake stroke according to the engine speed and the output of the airflow sensor 6, and detects the change of the operating state of the engine 1 in accordance with the calculated engine speed $N_E$, calculated intake air quantity (A/N), oxygen concentration of the exhaust gas detected by the $O_2$ sensor 22, operating states of the auxiliary devices detected by means of the various switches, etc.

The ECU 50 (fuel control means) controls the quantity of fuel injection from the fuel injection valve 3 (fuel supply regulating means) into the engine 1 in accordance with the engine operating state detected in the aforesaid manner. In this fuel injection quantity control, the ECU 50 computes a valve-opening time $T_{INJ}$ of the fuel injection valve 3 according to the following equation, supplies each fuel injection valve 3 with a driving signal corresponding to the computed valve-opening time $T_{INJ}$, thereby causing the valve 3 to open, and supplies each cylinder with a required quantity of fuel.

$$T_{INJ}=T_B \times K_{AF} \times K + T_{DEAD},$$

where K is the product ($K=K_{WT} \cdot K_{AT} \cdot \cdots$) of correction factors, such as a water temperature correction factor $K_{WT}$, intake air temperature correction factor $K_{AT}$, etc.; $K_{AF}$ is an air-fuel ratio correction factor; and $T_{DEAD}$ is a dead time correction value which is set in accordance with the battery voltage and the like.

In the case where the engine 1 is operated in an air-fuel ratio feedback area, a feedback correction factor $K_{FB}$ as the air-fuel ratio correction factor $K_{AF}$ is computed as follows:

$$K_{FB}=1.0+P+I+I_{LRN},$$

where P, I and $I_{LRN}$ are a proportional correction value, integral correction value (integral correction factor), and learning correction value, respectively.

Further, the ECU 50 controls the ignition timing of the spark plug 30 by drivingly controlling the ignition unit 32. As idling control means, furthermore, the ECU 50 drivingly controls the stepping motor 8b of the ISC valve 8 in accordance with the engine operating state, thereby controlling the ISC valve opening. In this case, the ECU 50 calculates the deviation between the engine speed and a target engine speed, and subjects the ISC valve 8 to feedback control so that the deviation is within a predetermined range, thereby keeping the engine speed substantially constant during idle operation.

Figure 2:
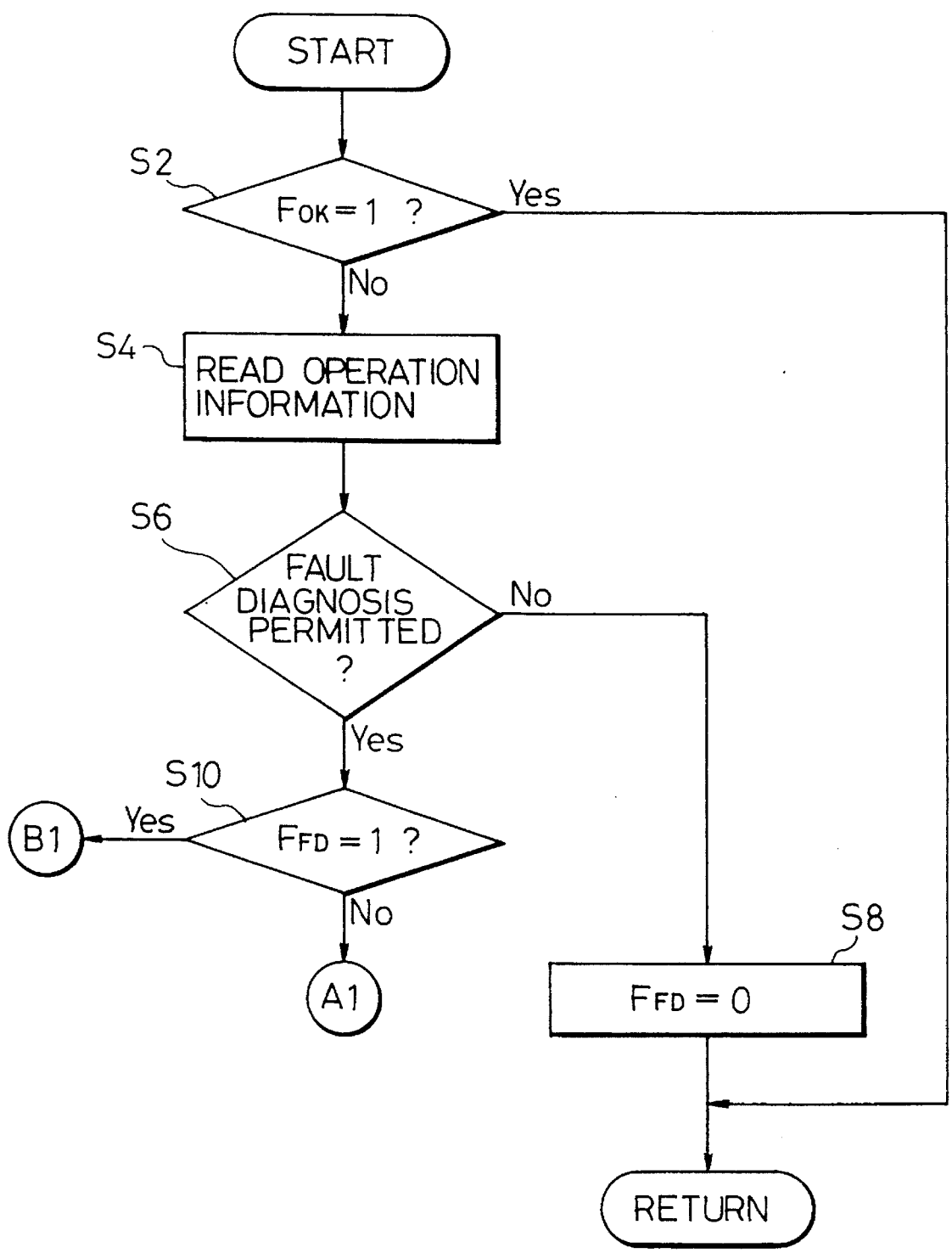
FIG. 2 is a flowchart showing part of a fault diagnosis subroutine executed by an engine control unit shown in FIG. 1.
Figure 3:
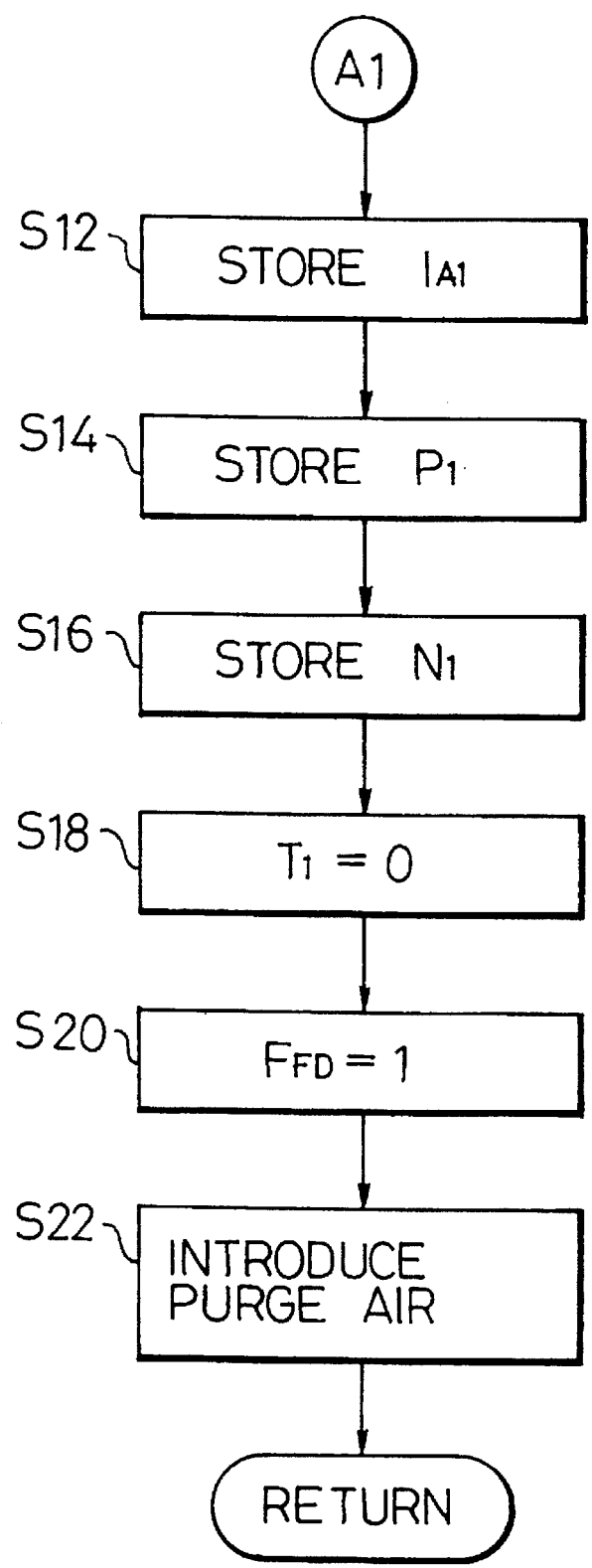
FIG. 3 is a flowchart showing a remainder of the fault diagnosis subroutine continued from FIG. 2.
Figure 4:
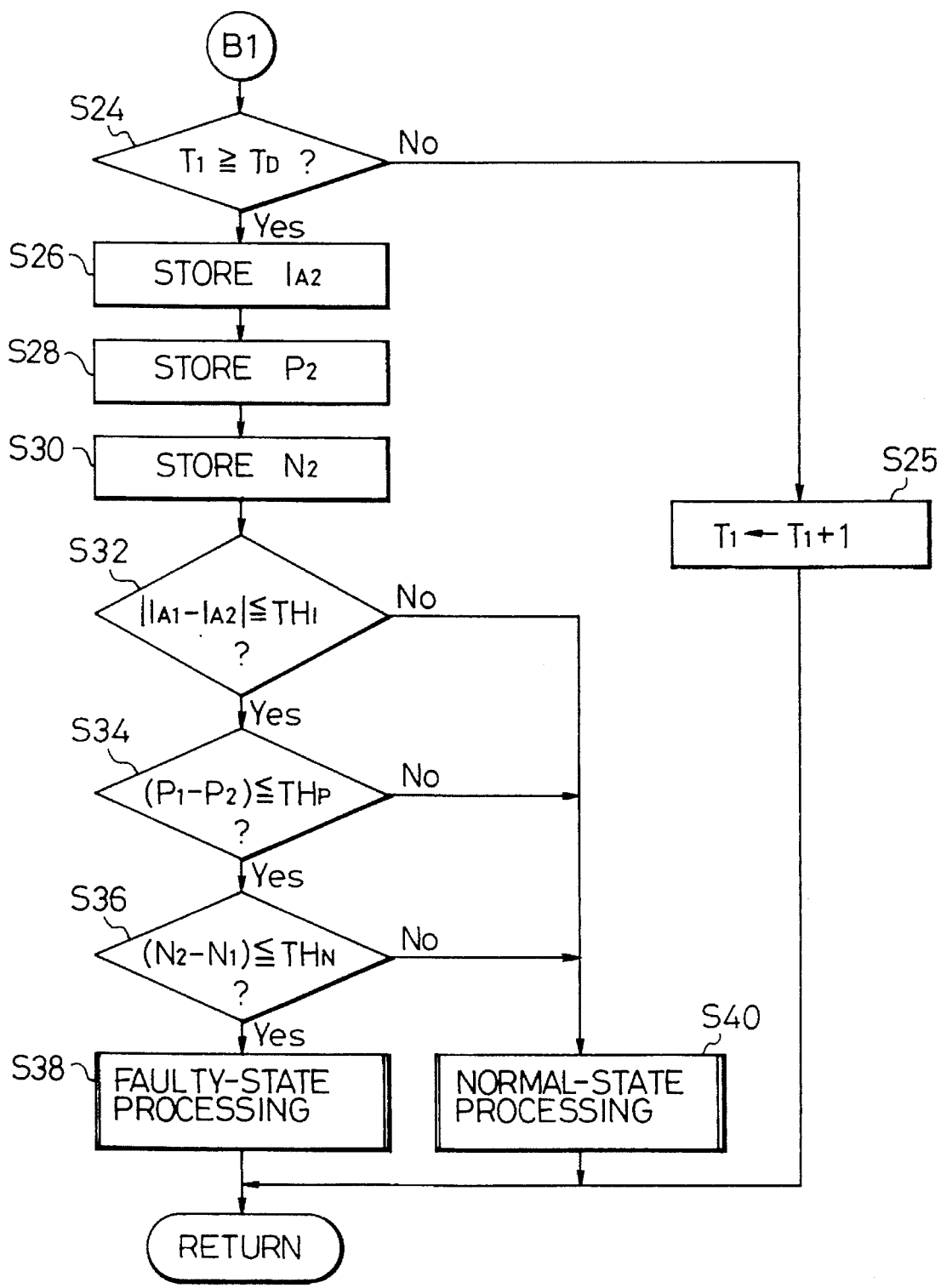
FIG. 4 is a flowchart showing another remainder of the fault diagnosis subroutine continued from FIG. 2.

Referring now to FIGS. 2 to 4, the operation of the fault diagnosis apparatus with the aforementioned construction will be described.

When the driver turns on an ignition key to start the engine 1, the ECU 50 starts to execute the fault diagnosis subroutine shown in FIGS. 2 to 4. At the same time, a first count-up timer for measuring the time period having elapsed since the start of the engine operation is activated.

In the fault diagnosis subroutine, it is first determined whether or not the value of a flag $F_{OK}$ is "1" which is indicative of a normal operation of the purge control valve 46 (Step S2). Immediately after this subroutine is started, a fault diagnosis on the control valve 46 in the subroutine is not executed yet, and it is unknown whether or not the valve 46 is operating normally. Immediately after the start of the subroutine, therefore, the flag $F_{OK}$ is set at an initial value "0". Thus, the decision in Step S2 in a first subroutine execution cycle (control cycle) is negative (No), whereupon the control flow advances to Step S4.

In Step S4, the count value in the first count-up timer, output of the water temperature sensor 26, output (on-off position) of the idle switch 55, etc. are read as pieces of operation information by the ECU 50 and stored in the RAM of the ECU 50.

In the next step or Step S6, it is determined whether or not fault diagnosis execution conditions are met by the current operating state. The fault diagnosis execution conditions include, for example, a first condition that a predetermined time period (e.g., 180 seconds) has passed since the start of the engine operation, a second condition that air-fuel ratio feedback control based on the output of the $O_2$ sensor 22 is started, a third condition that idling speed feedback control is being executed by the ISC valve 8, a fourth condition that the water temperature $T_W$ is not lower than a predetermined value (e.g., 82° C.), and a fifth condition that idle operation is being performed. The fault diagnosis execution conditions are considered to be fulfilled only when all of the first to fifth conditions are fulfilled simultaneously.

The decision in Step S6 in the first control cycle is No, since the predetermined time period has not elapsed yet since the start of the engine operation. In this case, it is concluded that the fault diagnosis execution conditions are not met, and the control flow advances to Step S8. In Step S8, a flag $F_{FD}$ is set at "0" which indicates that no fault diagnosis is being executed. Thereupon, the execution of the subroutine in the control cycle concerned (first cycle in this case) terminates.

When a time period corresponding to a subroutine execution period (predetermined period) is up, thereafter, the fault diagnosis subroutine shown in FIGS. 2 to 4 are rerun starting with Step S2. Thus, the ECU 50 repeatedly executes the fault diagnosis subroutine at intervals of the predetermined period.

Unless the fault diagnosis execution conditions are met, Steps S2, S4, S6 and S8 are executed repeatedly. As this is done, the ECU 50 executes a conventional purge control subroutine (not mentioned herein) in parallel with the fault diagnosis subroutine shown in FIGS. 2 to 4. Thus, the control valve 46 is drivingly controlled as required by the ECU 50, and ordinary purge air, not purge air for fault diagnosis, is introduced, if necessary.

Figure 7:
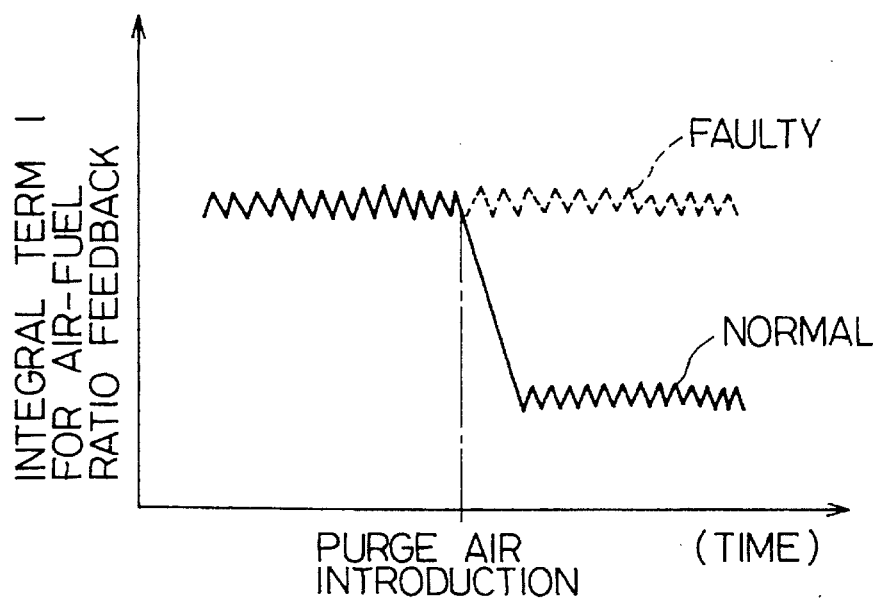
FIG. 7 is a graph showing the change of an integral term for air-fuel ratio feedback with the passage of time before and after purge air introduction.

If it is concluded in Step S6 that the fault diagnosis execution conditions are met by the current operating conditions, thereafter, the control flow advances to Step S10, whereupon it is determined whether or not the value of the flag $F_{FD}$ is "1" which indicates that the fault diagnosis is being executed. Immediately after the fault diagnosis execution conditions are fulfilled, the flag $F_{FD}$ remains at the initial value "0", so that the decision in Step S10 is No. In this case, the control flow advances to Step S12 of FIG. 3. In Step S12, the current integral term I for the air-fuel ratio feedback control before the purge air introduction is read a plurality of times at predetermined time intervals. As mentioned before, the integral term I is a control correction value used in calculating the feedback correction factor $K_{FB}$. During the air-fuel ratio feedback control, the integral term I continually increases or decreases depending on the output voltage of the $O_2$ sensor 22, as shown in FIG. 7. Subsequently, an average $I_{AVE}$ of the read values of the integral term I is calculated, and the resulting value is stored as a first integral value $I_{A1}$ in the RAM.

In the next step or Step S14, the current opening value of the ISC valve 8 or a valve position $P_V$ is read, and is stored as a first position $P_1$ in the RAM. As manipulated variable detecting means, the ECU 50 has a storage region in its RAM which renewably stores the number of driving pulses delivered from the ECU 50 to the stepping motor 8b of the ISC valve 8. The stored driving pulse number increases every time a driving pulse to drive the ISC valve 8 in the opening direction is delivered, and decreases every time a driving pulse to drive the valve 8 in the closing direction. Thus, the driving pulse number represents the current position of the ISC valve 8 (manipulated variable of the intake air regulating means). In Step S16, the current engine speed $N_E$ is calculated, and the resulting value is stored as a first speed $N_1$ in the RAM. Before the purge air introduction, the value of the valve position $P_V$ is relatively large, and the engine speed $N_E$ is relatively low.

In Step S18, measurement of the time period having elapsed since the start of purge air introduction is started. To attain this, a second count-up timer is activated after its count value $T_1$ is reset at "0". In the next step or Step S20, the flag $F_{FD}$ is set at "1" which indicates that the fault diagnosis is being executed. In Step S22, the purge control valve 46 is energized, whereupon introduction of the purge air for fault diagnosis is started, normally. Thereupon, the execution of the fault diagnosis subroutine in the control cycle concerned terminates.

Since the decision in Step S10 is Yes in the next control cycle, the control flow advances to Step S24 of FIG. 4. In Step S24, it is determined whether or not a predetermined value $T_D$ which is equal to a value obtained by dividing a given delay time by the fault diagnosis subroutine execution period is attained by the count value $T_1$ in the second timer. The predetermined value $T_D$ corresponds to a normally required period which elapses from the instant that the purge air introduction for fault diagnosis is started until the change of the operating state of the engine 1, attributable to the purge air introduction, is substantially settled. If the decision in Step S24 is No, "1" is added to the count value (Step S25), whereupon the execution of the fault diagnosis subroutine in the control cycle concerned terminates.

Thus, as long as the operating state which fulfills the fault diagnosis execution conditions lasts, thereafter, a series of steps including Steps S2, S4, S6, S10, S24 and S25 are executed repeatedly, whereby the count value $T_1$ in the second timer increases gradually. If the fault diagnosis execution conditions cease to be fulfilled during the execution of a fault diagnosis, the control flow advances to Step S8, whereupon the flag $F_{FD}$ is reset at "0". In this case, the execution of the fault diagnosis is interrupted, and another fault diagnosis is started when the fault diagnosis execution conditions are fulfilled again, thereafter.

Figure 8:
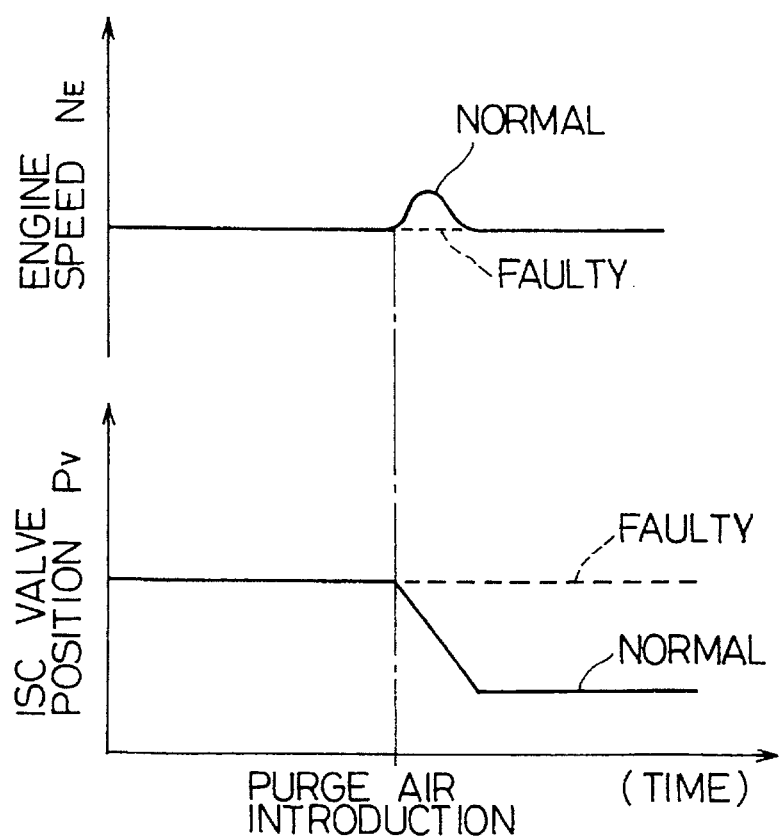
FIG. 8 is a graph showing the change of an engine speed and ISC valve position with the passage of time before and after purge air introduction.

The air-fuel ratio of the purge air introduced for the fault diagnosis varies depending on the quantity of the fuel evaporative gas adsorbed by the canister 41, etc. The value of the integral term I decreases if the air-fuel ratio of the purge air is richer than the theoretical air-fuel ratio, and increases if the air-fuel ratio is leaner. After the purge air introduction, the value of the valve position $P_V$ is reduced by a margin corresponding to the quantity of the introduced purge air, as shown in FIG. 8. The engine speed $N_E$ temporarily increases as the purge air is introduced, and thereafter, is restored to a predetermined value by the idling speed feedback control by means of the ISC valve 8.

If a fault in the purge control valve 46 prevents the purge air introduction, the value of the integral term I makes no change (indicated by broken line in FIG. 7), and neither of the valve position $P_V$ and the engine speed $N_E$ change (indicated by broken lines in FIG. 8).

In the fault diagnosis subroutine, if the attainment of the predetermined value $T_D$ by the count value $T_1$ is detected in Step S24, and hence if it is concluded that the change of the engine operating state attributable to the purge air introduction is substantially settled, the control flow advances to Step S26. In Step S26, the current integral term I for the air-fuel ratio feedback control after the purge control valve 46 is driven so as to be opened (or after the purge air introduction) is read a plurality of times at predetermined time intervals, and an average $I_{AVE}$ of the read values of the integral term I is calculated and stored as a second integral value $I_{A2}$ in the RAM.

In the next step or Step S28, the current valve position $P_V$ is stored as a second position $P_2$ in the RAM. In Step S30, the current engine speed $N_E$ is stored as a second speed $N_2$ in the RAM.

In Step S32, the absolute value ($|I_{A1}-I_{A2}|$) of the deviation between the first and second integral values $I_{A1}$ and $I_{A2}$ is calculated, and it is then determined whether or not this absolute value is smaller than a predetermined threshold value $TH_I$.

The absolute value of the integral value deviation is a significant value in the case where rich or lean purge air is normally introduced. If no purge air is introduced due to a fault in the purge control valve 46, on the other hand, the absolute value of the deviation is 0. In the case where the air-fuel ratio of the purge air is very close to the theoretical air-fuel ratio, however, the value of the integral value I hardly varies despite the normal introduction of the purge air, so that the integral value deviation is nearly 0. Thus, in the case where the air-fuel ratio of the purge air is approximate to the theoretical air-fuel ratio, it is inappropriate to make a definite fault diagnosis in accordance with the integral value deviation.

Thus, according to the present embodiment, even if the decision in Step S32 is Yes, that is, even in the case where the result of the diagnosis based on the change of the air-fuel ratio which is attributable to the purge air introduction represents the occurrence of a fault, it is not definitely concluded that the fault has occurred, and the fault diagnosis is further executed in accordance with the change of the manipulated variable of the ISC valve 8, which is caused when the purge control valve 46 is driven so as to be opened (or when the purge air is introduced), and the change of the engine speed.

Thus, in Step S34, the deviation $(P_1-P_2)$ between the first and second positions $P_1$ and $P_2$ is calculated, and it is determined whether or not the calculated deviation is smaller than a predetermined threshold value $TH_P$. If the decision in Step S34 is Yes, the deviation $(N_2-N_1)$ between the second and first speeds $N_2$ and $N_1$ is calculated, and it is further determined whether or not the calculated deviation is smaller than a predetermined threshold value $TH_N$, in Step S36.

If the decisions in Steps S32, S34 and S36 are all Yes, that is, if no change of the operating state attributable to the purge air introduction is detected even though the purge control valve 46 is energized in Step S22, the occurrence of a fault is identified definitely. In this case, a faulty-state processing subroutine is executed in Step S38 by the ECU 50.

Figure 5:
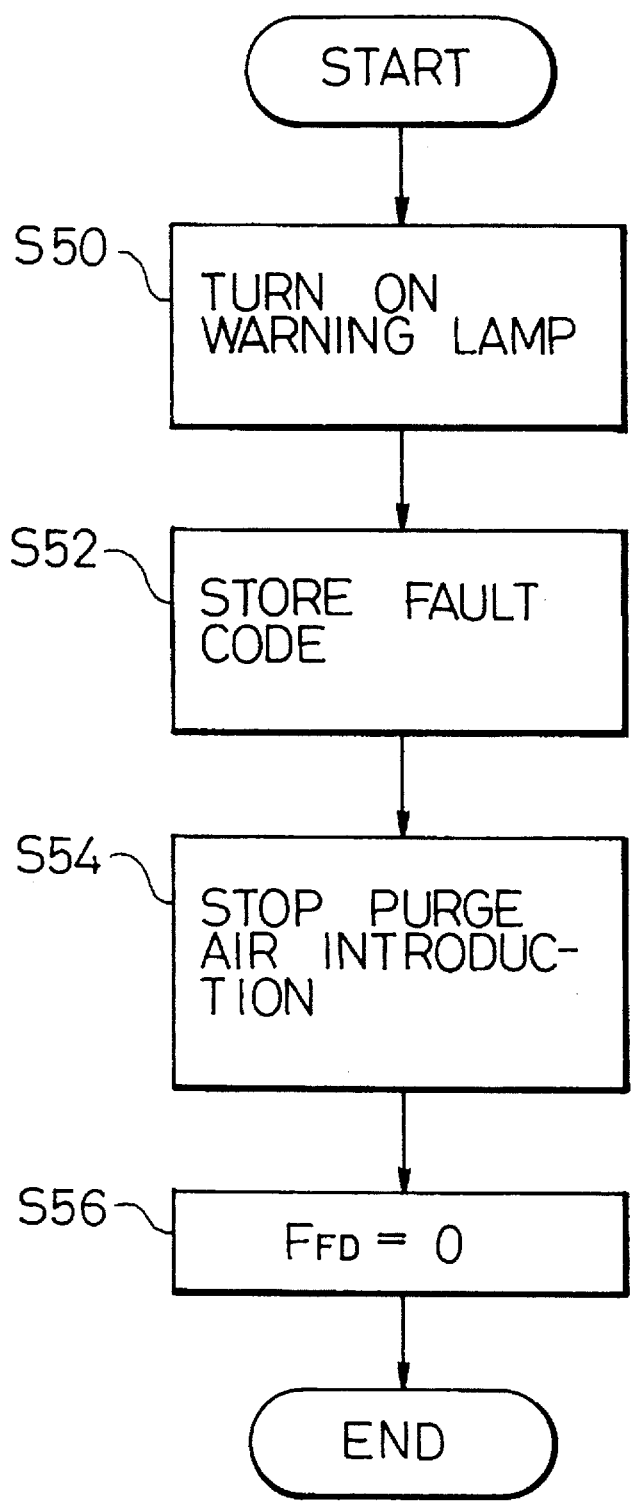
FIG. 5 is a flowchart of a faulty-state processing subroutine shown in FIG. 4.

In the faulty-state processing subroutine, as is shown in detail in FIG. 5, the warning lamp 47 is turned on in Step S50, thereby giving the driver warning. In the next step or Step S52, a fault code for diagnosis is stored in the RAM. In Step S54, moreover, the purge control valve 46 is de-energized, whereupon the purge air introduction for fault diagnosis is interrupted. Then, in Step S56, the flag $F_{FD}$ is reset at "0" which indicates that no fault diagnosis is being executed. Thereupon, the execution of the fault diagnosis subroutine in the control cycle concerned terminates.

If the fault in the fuel evaporative emission suppressing system is a temporary one, the system sometimes may be restored to its normal state even after it is concluded to be faulty. In other words, the conclusions in Steps S32, S34 and S36 that the suppressing system is faulty may possibly be inappropriate. Even when the suppressing system is once concluded to be faulty, therefore, the fault diagnosis is rerun in the fault diagnosis subroutine shown in FIGS. 2 to 4.

If the change of the operating state attributable to the purge air introduction for fault diagnosis is detected, that is, if any of the decisions in Steps S32, S34 and S36 is No, a normal-state processing subroutine is executed in Step S40 by the ECU 50.

Figure 6:
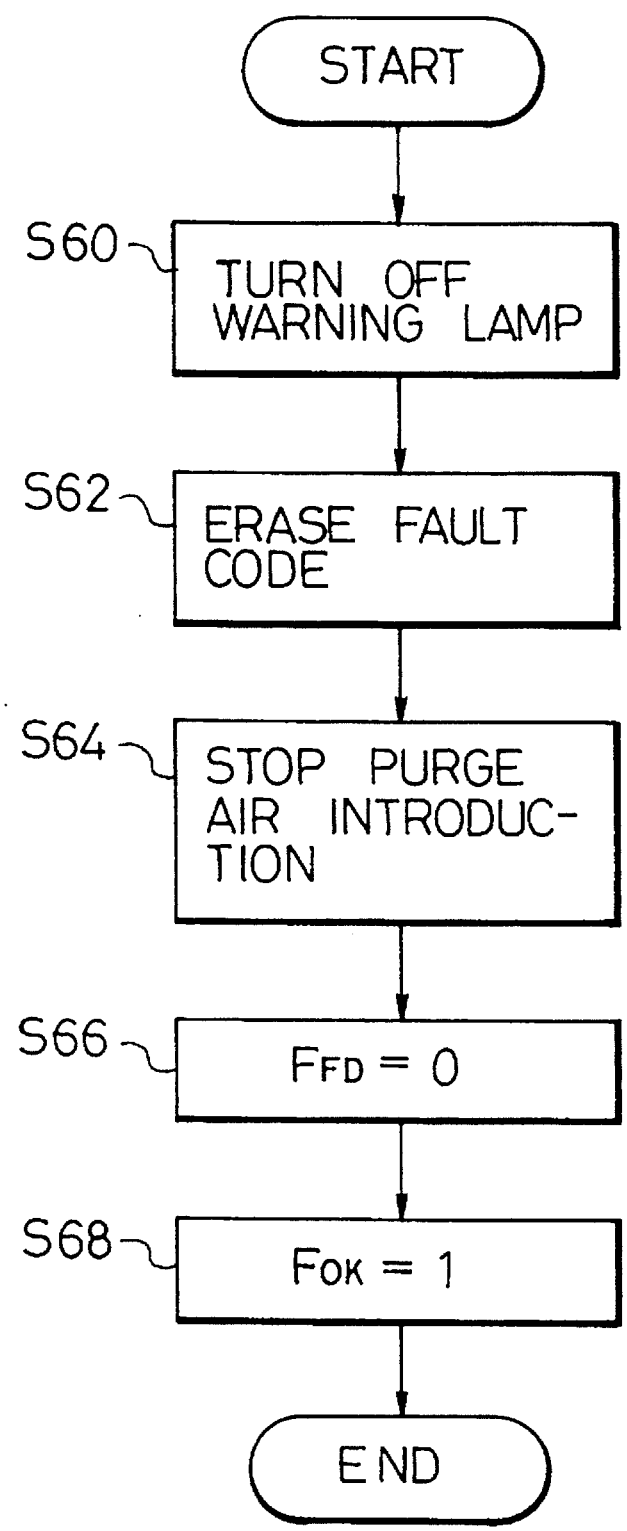
FIG. 6 is a flowchart of a normal-state processing subroutine shown in FIG. 4.

In the normal-state processing subroutine, as is shown in detail in FIG. 6, the warning lamp 47 is turned off Step S60, and the fault code for diagnosis is deleted from the RAM in Step S62. In the next step or Step S64, the purge control valve 46 is de-energized, whereupon the purge air introduction for fault diagnosis is interrupted. Then, in Step S66, the second flag $F_{FD}$ is reset at "0" which indicates that no fault diagnosis is being executed. In Step S68, thereafter, the flag $F_{OK}$ is set at "1" which indicates that the fuel evaporative emission suppressing system is normal. Once the suppressing system is thus concluded to be normal, the decision in Step S2 in the fault diagnosis subroutine shown in FIGS. 2 to 4 is Yes, so that the execution of this subroutine terminates immediately, that is, no substantial processing is carried out. If the ignition key is turned on after it is once turned off, however, substantial processing in the fault diagnosis subroutine is executed again.

According to the present embodiment, the fault diagnosis is made in the aforesaid steps of procedure, so that a fault, if any, in the purge control valve can be detected accurately and quickly, and the fuel evaporative gas can be securely prevented from being discharged into the atmosphere. Further, a final fault diagnosis is made by combining three operating states before and after the control valve 46 is driven so as to be opened (or the purge air is introduced), based on the integral value deviation in the air-fuel ratio feedback control, engine speed deviation, and ISC valve position deviation. Thus, there is hardly any possibility of an erroneous diagnosis.

The following is a description of a fault diagnosis apparatus according to a second embodiment of the present invention.

When the execution and interruption of the purge air introduction for fault diagnosis are repeated alternately and frequently, depending on the change of the operating conditions of the vehicle or engine, the speed or output torque of the engine fluctuates, so that the comfortableness to drive or drivability of the vehicle is worsened. Accordingly, the fault diagnosis apparatus according to the present embodiment is characterized in that the execution of the fault diagnosis is prohibited during a given period after predetermined diagnosis interruption conditions are fulfilled by the operating state of the vehicle, engine, or means associated with the engine operation, whereby the aforesaid awkward situation can be avoided.

Thus, in the fault diagnosis apparatus according to the present embodiment, an electronic control unit (ECU) functions as fault diagnosis prohibiting means for prohibiting the execution of the fault diagnosis during the given period after the diagnosis interruption conditions are fulfilled by the operating state of the vehicle or engine. Except for this, the apparatus of the present embodiment is constructed basically in the same manner as the apparatus of FIG. 1. Therefore, a description of the construction of the fault diagnosis apparatus according to the second embodiment is omitted.

The following is a description of the operation of the fault diagnosis apparatus according to the present embodiment.

Figure 9:
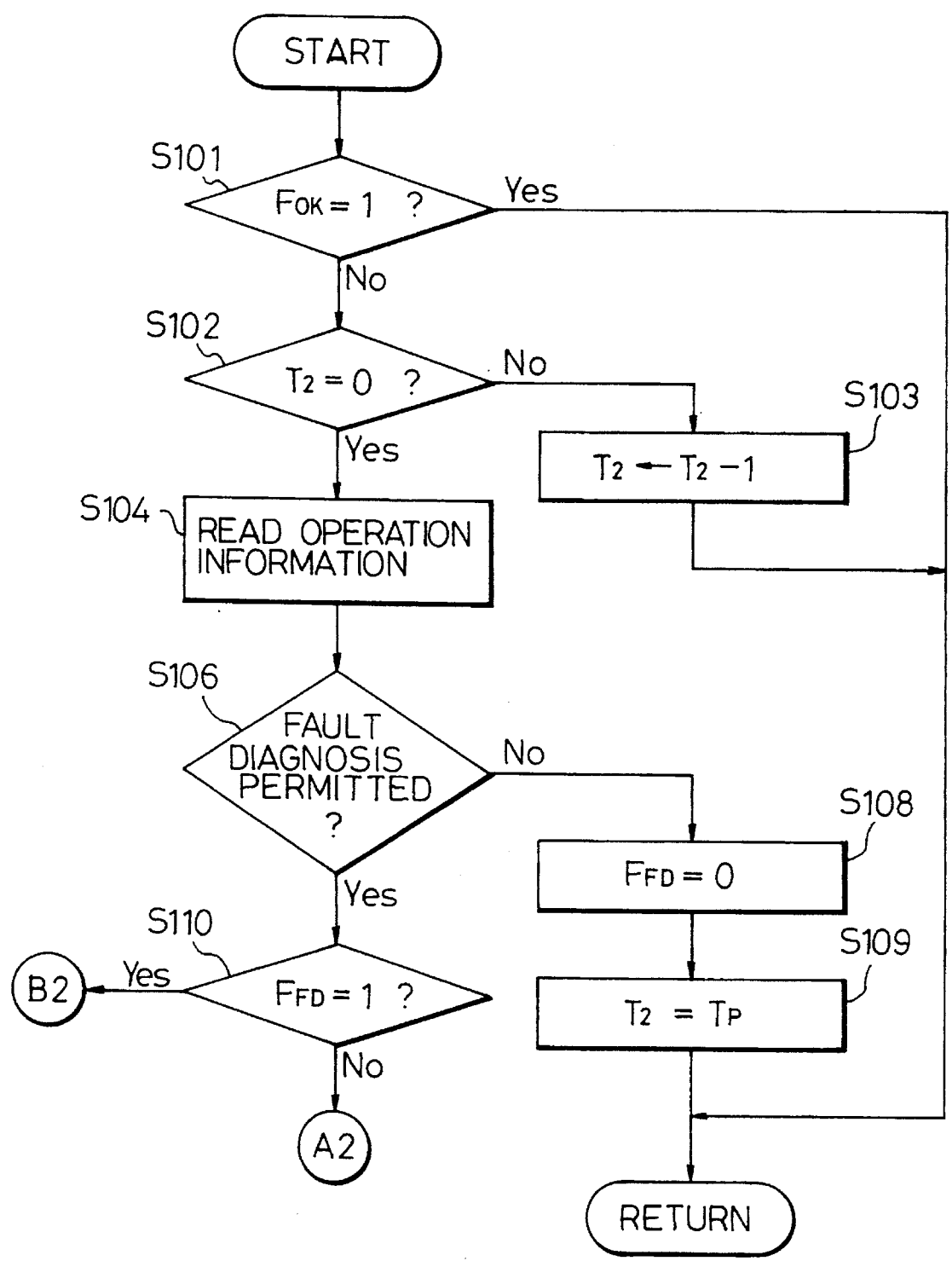
FIG. 9 is a flowchart showing part of a fault diagnosis subroutine executed by a fault diagnosis apparatus according to a second embodiment of the invention.
Figure 10:
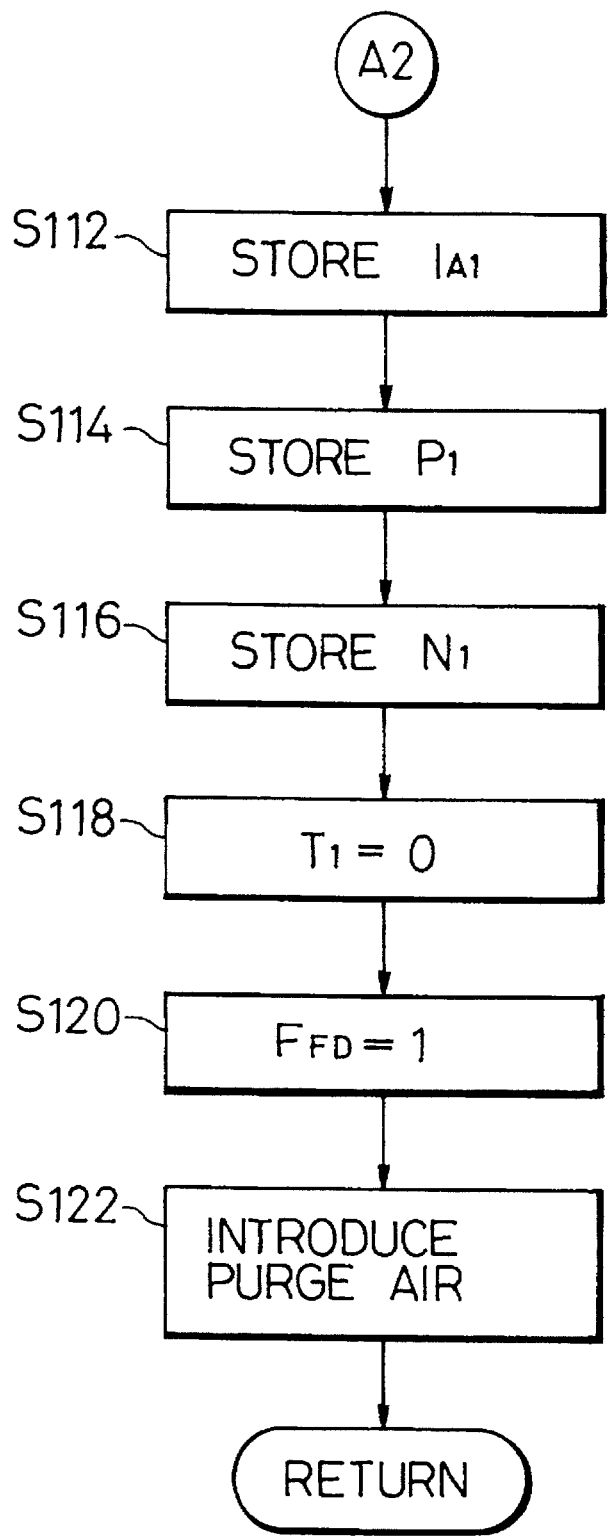
FIG. 10 is a flowchart showing a remainder of the fault diagnosis subroutine continued from FIG. 9.
Figure 11:
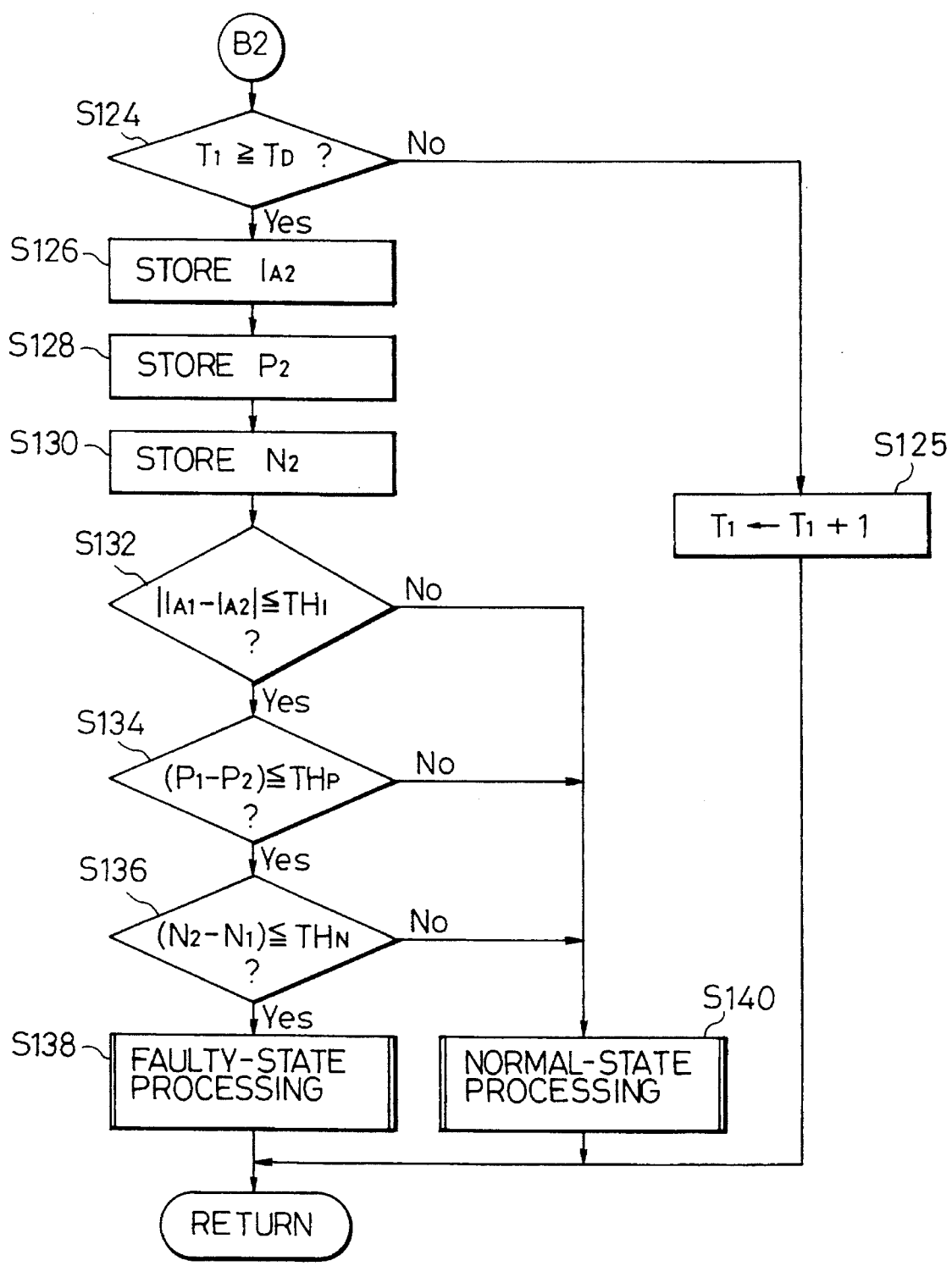
FIG. 11 is a flowchart showing another remainder of the fault diagnosis subroutine continued from FIG. 9.

When the engine 1 is started, the ECU 50 starts to execute the fault diagnosis subroutine shown in FIGS. 9 to 11. At the same time, a first count-up timer for measuring the time period having elapsed since the start of the engine operation is activated.

Basically, the fault diagnosis subroutine of FIGS. 9 to 11 are identical with the subroutine of FIGS. 2 to 4. In Steps S101, S104, S106, S108 and S110 of FIG. 9, the same processes as the ones executed in Steps S2, S4, S6, S8 and S10, respectively, are executed. In Steps S112, S114, S116, S118, S120 and S122 of FIG. 10, moreover, the same processes as the ones executed in Steps S12, S14, S16, S18, S20 and S22, respectively, are executed. In Steps S124, S125, S126, S128, S130, S132, S134, S136, S138 and S140 of FIG. 11, furthermore, the same processes as the ones executed in Steps S24, S25, S26, S28, S30, S32, S34, S36, S38 and S40 of FIG. 4, respectively, are executed. Therefore, a description of the processes executed in these steps is omitted or simplified.

In the fault diagnosis subroutine shown in FIGS. 9 to 11, it is determined whether or not the value of the flag $F_{OK}$ is "1" (Step S101). Since the decision in Step S101 in a first subroutine execution cycle is No, so that the control flow advances to Step S102.

In Step S102, it is determined whether or not a count value $T_2$ in a count-down timer in the ECU 50 is "0". As mentioned later, the count value $T_2$ is set at a value $T_P$ which corresponds to a standby time when fault diagnosis execution conditions in which the execution of a fault diagnosis on a purge control valve 46 is permitted are not fulfilled. Immediately after the start of the present subroutine, on the other hand, it is not determined yet whether or not the fault diagnosis execution conditions are fulfilled. Thus, the count value $T_2$ immediately after the start of the subroutine is set at the initial value "0", so that the decision in Step S102 is Yes.

In this case, pieces of operation information from various sensors are read in a RAM (Step S104). Then, it is determined whether or not the current operating state meets the fault diagnosis execution conditions (Step S106). Since the decision in Step S106 is No immediately after the start of the engine operation, the flag $F_{FD}$ is set at "0" which indicates that no fault diagnosis is being executed (Step S108). In the next step or Step S109, the count value $T_2$ in the count-down timer is set at $T_P$ which is equal to a value obtained by dividing the predetermined standby time (e.g., 20 seconds) by the subroutine execution period. Thereupon, the execution of the subroutine in the control cycle concerned (first cycle in this case) terminates.

In a second and subsequent control cycles, either of the decisions in Steps S101 and S102 are No, so that the control flow advances to Step S103. In Step S103, "1" which corresponds to the subroutine execution period is subtracted from the count value $T_2$ in the count-down timer, whereupon the control flow returns to Step S101. Thus, in the second and subsequent control cycles, Steps S101, S102 and S103 are repeatedly executed at intervals of a predetermined period. As this is done, normal purge air introduction, not the purge air introduction for fault diagnosis, is executed as required.

If the decision in Step S102 in a subsequent control cycle is Yes, that is, if it is concluded that the count value $T_2$ is equal to "0" (the standby time is over), the control flow advances to Step S106 via Step S104. Thus, it is determined again whether or not the current operating state, which is represented by the pieces of operation information detected in Step S104, fulfills the fault diagnosis execution conditions.

If the decision in Step S106 is No, the flag $F_{FD}$ is set at "0" which indicates that no fault diagnosis is being executed (Step S108), and the count value $T_2$ is then set at $T_P$ (Step S109), as in the case of the first control cycle.

If it is concluded in Step S106 that the current operating state fulfills the fault diagnosis execution conditions, on the other hand, the control flow advances to Step S110. In Step S110, it is determined whether or not the value of the flag $F_{FD}$ is "1" which indicates that the fault diagnosis is being executed. Since the flag $F_{FD}$ is kept at the initial value "0" immediately after the fault diagnosis execution conditions are fulfilled, the decision in Step S110 is No. In this case, Steps S112 to S122 of FIG. 10, which correspond to Steps S12 to S22 of FIG. 3, respectively, are executed in succession.

In brief, an average $I_{AVE}$ of the values of the integral term I for the current air-fuel ratio feedback control before purge air introduction is calculated as a first integral value $I_{A1}$ (Step S112), and the current position $P_V$ of the ISC valve 8 is read as a first position $P_1$ (Step S114). Also, the current engine speed $N_E$ is calculated as a first speed $N_1$ (Step S116). Further, a second count-up timer for measuring the time period having elapsed since the start of the purge air introduction is restarted (Step S118), the flag $F_{FD}$ is set at "1" which indicates that the fault diagnosis is being executed (Step S120), and the purge control valve 46 is energized (Step S122). In consequence, purge air introduction for fault diagnosis is started normally.

In the next control cycle, the decision in Step S110 is Yes. In this case, Steps S124 to S140 of FIG. 11, which correspond to Steps S24 to S40 of FIG. 4, respectively, are executed.

In brief, it is determined whether or not the predetermined value $T_D$ is attained by the count value $T_1$ in the second timer (Step S124). If the decision in Step S124 is No, "1" is added to the count value $T_1$ (Step S125). As long as the operating state which fulfills the fault diagnosis execution conditions lasts, thereafter, Steps S101, S102, S104, S106, S110, S124 and S125 are executed repeatedly, whereby the count value $T_1$ in the second timer increases gradually.

If it is concluded in Step S124 that the predetermined value $T_D$ is attained by the count value $T_1$, an average $I_{AVE}$ of the values of the integral term I for the current air-fuel ratio feedback control after the purge control valve 46 is driven so as to be opened (or after the purge air introduction) is calculated as a second integral value $I_{A2}$ (Step S126), the current position $P_V$ of the ISC valve 8 is read as a second position $P_2$ (Step S128), and the current engine speed $N_E$ is read as a second speed $N_2$ (Step S130). Also, it is determined whether or not the absolute value ($|I_{A1}-I_{A2}|$) of the deviation between the first and second integral values $I_{A1}$ and $I_{A2}$ is smaller than the threshold value $TH_I$ (Step S132). If the decision in Step S132 is Yes, it is determined whether or not the deviation ($P_1-P_2$) between the first and second positions $P_1$ and $P_2$ is smaller than the threshold value $TH_P$ (Step S134). If the decision in Step S134 is Yes, it is further determined whether or not the deviation ($N_2-N_1$) between the second and first speeds $N_2$ and $N_1$ is smaller than the threshold value $TH_N$ (Step S136).

If the decisions in Steps S132, S134 and S136 are all Yes, a faulty-state processing subroutine (FIG. 12) is executed in Step S138 by the ECU 50.

Figure 12:
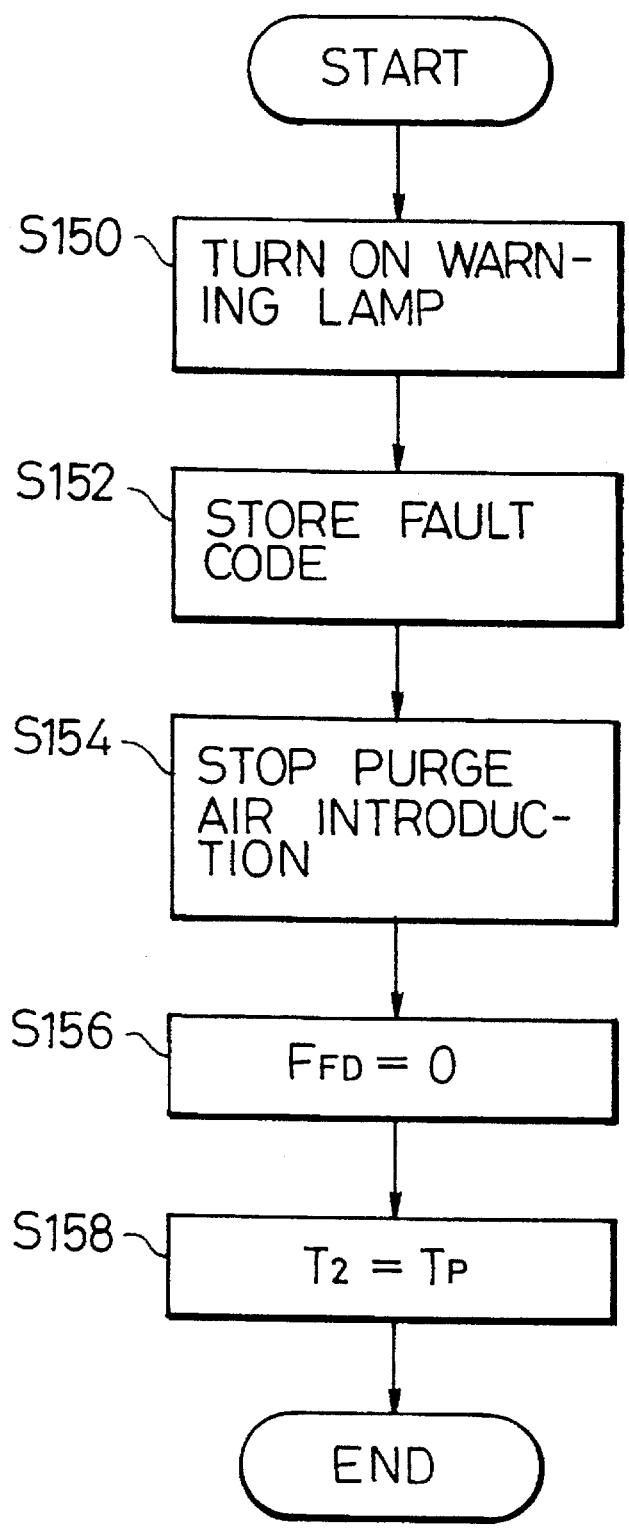
FIG. 12 is a flowchart of a faulty-state processing subroutine shown in FIG. 11.

In Steps S150, S152, S154 and S156 in the faulty-state processing subroutine of FIG. 12, the same processes as the ones executed in Steps S50, S52, S54 and S56 in the subroutine of FIG. 5, respectively, are executed.

In brief, a warning lamp 47 is turned on (Step S150), a fault code for diagnosis is stored in the RAM (Step S152), the purge control valve 46 is de-energized (Step S154), and the flag $F_{FD}$ is reset at "0" which indicates that no fault diagnosis is being executed (Step S156).

In the next step or Step S158, the value $T_2$ in the count-down timer is set at the value $T_P$ which corresponds to the standby time, whereupon the faulty-state processing subroutine of FIG. 12 terminates, and the control flow returns to the fault diagnosis subroutine of FIGS. 9 to 11.

In the fault diagnosis subroutine executed after the termination of the faulty-state processing subroutine, the decisions in Steps S101 and S102 are No, so that Steps S101, S102 and S103 are repeatedly executed in a manner such that the count value $T_2$ in the count-down timer is gradually reduced from the value $T_P$ which corresponds to the standby time. Thus, the execution of the fault diagnosis is prohibited during the standby time after the point of time when it is concluded that the fuel evaporative emission suppressing system is faulty. This is done because the execution and interruption of the purge air introduction are repeated and may possibly cause frequent fluctuations of the torque of the engine 1 if the purge air introduction for fault diagnosis is permitted with the suppressing system faulty.

If the malfunction in the fuel evaporative emission suppressing system is a temporary one, on the other hand, the system sometimes may be restored to its normal state after it is concluded to be faulty.

Even when the suppressing system is once concluded to be faulty, the fault diagnosis can be rerun when the standby time after the diagnosis is over. Thus, if it is concluded in Step S102 that the count value $T_2$ is equal to "0" when the standby time following the identification of the occurrence of the fault is over, the processes of Step S104 and the subsequent steps are executed.

In the case where the change of the operating state attributable to the purge air introduction for fault diagnosis is detected when Step S132, S134 or S136 of FIG. 11 is first executed in the fault diagnosis subroutine of FIGS. 9 to 11, on the other hand, that is, if any of the decisions in Steps S132, S134 and S136 is No, a normal-state processing subroutine (FIG. 6) is executed in Step S140 by the ECU 50. Even when the fuel evaporative emission suppressing system is once concluded to be faulty, moreover, the normal-state processing subroutine is executed if the decision in Step S132, S134 or S136 rerun thereafter is No.

Since the normal-state processing subroutine has already been described, it will be explained in brief below. In this subroutine, the warning lamp 47 is turned off (Step S60), the fault code for diagnosis is deleted from the RAM (Step S62), the purge control valve 46 is de-energized (Step S64), the second flag $F_{FD}$ is reset at "0" which indicates that no fault diagnosis is being executed (Step S66), and the flag $F_{OK}$ is set at "1" which indicates that the fuel evaporative emission suppressing system is normal (Step S68).

Since the decision in Step S101 is Yes in the fault diagnosis subroutine executed after the termination of the normal-state processing subroutine, the control flow returns at once to Step S101. In the fault diagnosis subroutine, therefore, no substantial processing is carried out until the ignition key is turned on again after it is once turned off.

In Step S106 of the fault diagnosis subroutine, moreover, the fault diagnosis execution conditions sometimes may fail to be fulfilled, that is, the decision in Step S106 may be No, since the vehicle is accelerated while the fault diagnosis is being executed after the recognition of the fulfillment of the fault diagnosis execution conditions, for example. In this case, the control flow advances to Step S108, whereupon the flag $F_{FD}$ is reset at "0". In the next step or Step S109, the value $T_2$ in the count-down timer is set at the value $T_P$ which corresponds to the standby time. As a result, a substantial fault diagnosis is interrupted during the standby time after the point of time when the fault diagnosis execution conditions are rendered unfulfilled during the execution of the fault diagnosis. Thus, torque fluctuations, worsening of the drivability, etc., which are attributable to frequent repetition of the execution and interruption of the purge air introduction, can be prevented. When the standby time is over, that is, if both the decisions in Steps S102 and S106 are Yes, a new fault diagnosis is started.

According to the present embodiment, the fault diagnosis intervals are long enough even when the vehicle is running in an urban district where the operating state of the vehicle and/or engine 1 changes so easily that the fault diagnosis is liable to be interrupted. Thus, worsening of the comfortableness to drive or drivability of the vehicle, which is attributable to frequent repetition of the execution and interruption of the purge air introduction for fault diagnosis, can be prevented.

The following is a description of a fault diagnosis apparatus according to a third embodiment of the present invention.

In the case where the engine load at the time of the purge air introduction for fault diagnosis is heavy, the intake air quantity is made greater than in the case of a low-load operation, in order to increase the torque produced by the engine, so that the influence of the purge air introduction on the operating state is lessened, naturally. Even though the fuel evaporative emission suppressing system is normal, therefore, the variation of the operating state of the engine or the like sometimes may not be able to exceed the fault diagnosis threshold value during purge air introduction. In this case, an erroneous diagnosis is caused. When the speed range of the automatic transmission is switched between ranges N and D, or when the magnet clutch of the cooler compressor of the air conditioner is engaged or disengaged during the operation of the air conditioner to change the engine load substantially, the ISC valve is actuated in the opening or closing direction so as to compensate for the change of the engine speed which accompanies the change of the engine load. In this case, the reliability of the fault diagnosis based on the manipulated variable of the ISC valve during the purge air introduction is lowered.

Accordingly, the fault diagnosis apparatus according to the present embodiment is characterized in that the aforesaid problems are solved by interrupting the fault diagnosis when the engine load is heavy or is greatly changed.

Thus, an electronic control unit (ECU) in the fault diagnosis apparatus of the present embodiment functions as fault diagnosis interrupting means for interrupting the fault diagnosis when the engine is in a predetermined loaded state or when the engine load is changed. Except for this, the apparatus of the present embodiment is constructed basically in the same manner as the apparatus of FIG. 1. Therefore, a description of the construction of the fault diagnosis apparatus according to the third embodiment is omitted.

The following is a description of the operation of the fault diagnosis apparatus according to the present embodiment.

When the engine 1 is started, the ECU 50 starts to execute a fault diagnosis subroutine. At the same time, a first count-up timer for measuring the time period having elapsed since the start of the engine operation is activated.

Figure 13:
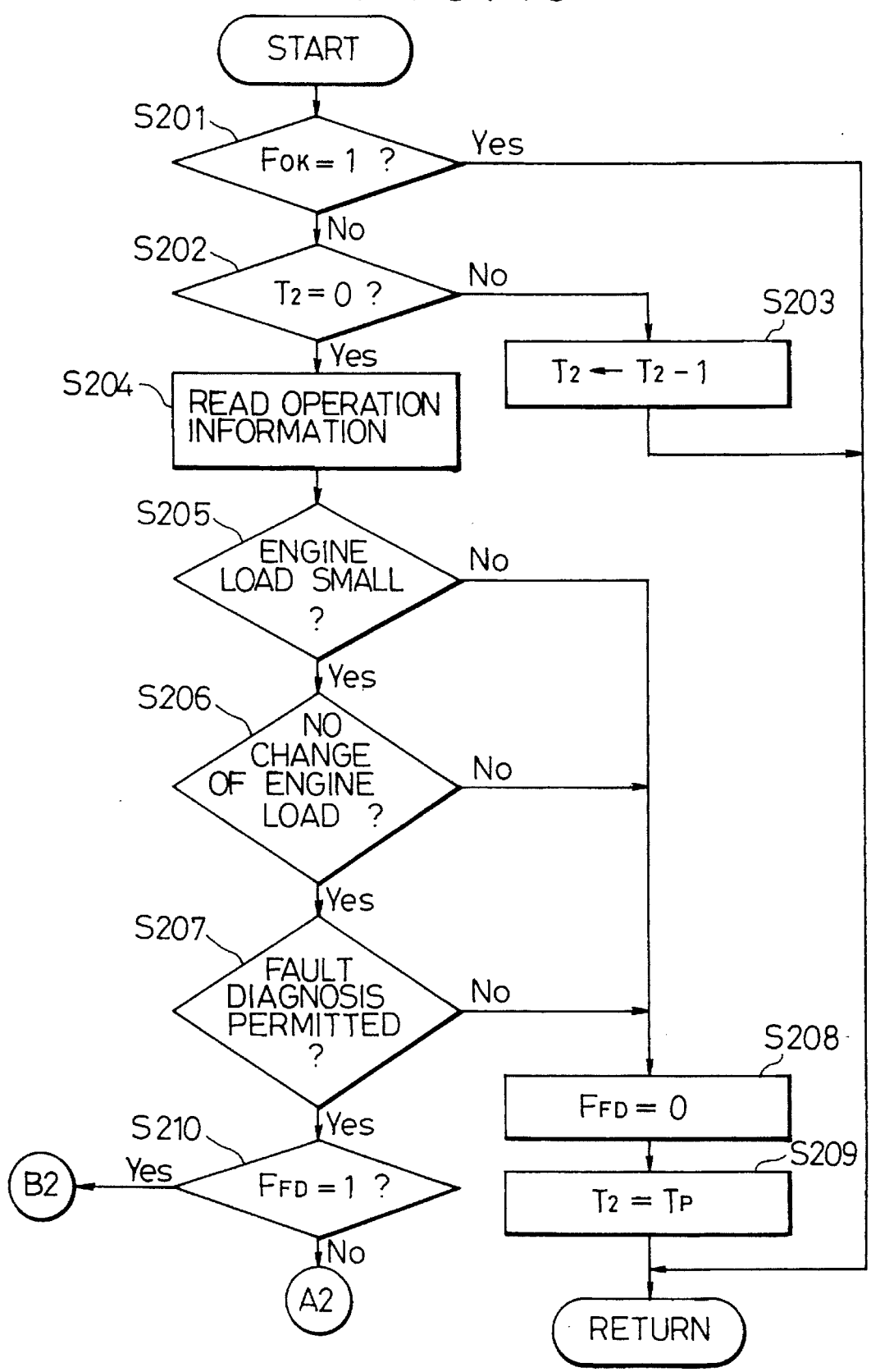
FIG. 13 is a flowchart showing part of a fault diagnosis subroutine executed by a fault diagnosis apparatus according to a third embodiment of the invention.

This fault diagnosis subroutine includes the processes shown in FIG. 13 and the processes shown in FIGS. 10 and 11. The processes shown in FIG. 13 are basically the same as the ones shown in FIG. 9. In Steps S201, S202, S203, S204, S207, S208, S209 and S210 of FIG. 13, the same processes as the ones executed in Steps S101, S102, S103, S104, S106, S108, S109 and S110 of FIG. 9, respectively, are executed. Therefore, a description of the processes executed in these steps is omitted or simplified.

In the fault diagnosis subroutine, it is determined whether or not the value of the flag $F_{OK}$ is "1" (Step S201). Since the decision in Step S201 in a first subroutine execution cycle is No, the control flow advances to Step S202, whereupon it is determined whether or not the count value $T_2$ in the count-down timer is "0". Since the decision in Step S202 immediately after the start of the subroutine is Yes, moreover, the control flow advances to Step S204, whereupon pieces of operation information from various sensors are read by a RAM.

In the next step or Step S205, it is determined whether or not the internal engine load is smaller than a predetermined value in accordance with various input signals. Thus, it is first determined whether or not the intake air quantity A/N for each intake stroke of the engine 1, which is calculated according to detection signals from the airflow sensor 6 and the crank angle sensor 25, is smaller than a predetermined threshold valve $A/N_{th}$. Then, it is determined whether or not a volumetric efficiency ηv, which is calculated according to the intake air quantity A/N and a cylinder capacity VS, is smaller than a predetermined threshold value $\eta_{vth}$. Further, it is determined whether or not the value of the opening of the ISC valve 8 or valve position $P_V$ is smaller than a threshold valve $A/N_{th}$.

If all of the three decisions are positive, the decision in Step S205 is Yes, that is, the internal engine load is concluded to be smaller than the predetermined value. In this case, the control flow advances to Step S206, whereupon it is determined, in accordance with various input signals, whether or not the external engine load is not changed.

More specifically, it is first determined, in accordance with a signal from the inhibitor switch 51, whether or not the speed range of the automatic transmission is switched between non-running ranges (ranges P and N) and running ranges (ranges R, D, 1 and 2). Then, it is determined, in accordance with a signal from the cooler switch 52, whether or not the magnet clutch of the cooler compressor is engaged or disengaged. Also, it is determined, in accordance with a signal from the charge switch 53, whether or not the alternator is switched between a non-generating state and a generating state. Further, it is determined, in accordance with a signal from the P/S switch 54, whether or not the discharge pressure of the power steering pump is increased or decreased.

If none of these four engine loads are changed, the decision in Step S206 is Yes. In this case, the control flow advances to Step S207, whereupon it is determined whether or not the current operating state fulfills the fault diagnosis execution conditions.

Since the decision in Step S207 is No immediately after the start of engine operation, the flag $F_{FD}$ is set at "0" which indicates that no fault diagnosis is being executed (Step S208). In the next step or Step S209, the count value $T_2$ in the count-down timer is set at the predetermined value $T_P$ which corresponds to the standby time. Thereupon, the execution of the subroutine in the control cycle concerned terminates.

In a second and subsequent control cycles, either of the decisions in Steps S201 and S202 are No, so that the control flow advances to Step S203, whereupon "1" is subtracted from the count value $T_2$. Thus, in the second and subsequent control cycles, Steps S201, S202 and S203 are repeatedly executed in a predetermined period.

If the decision in Step S205 or S206 is No as this is done, the flag $F_{FD}$ is set at "0" which indicates that no fault diagnosis is being executed (Step S208), and the count value $T_2$ is set at the value $T_P$ (Step S209). Thus, when it is detected that the engine load is heavy or is changed, the execution of the fault diagnosis is prohibited during the standby time after the point of time of the detection despite the fulfillment of the fault diagnosis execution conditions.

If the decision in Step S202 in a subsequent control cycle is Yes, the control flow advances to Step S205 via Step S204. If it is concluded in Step S205 that the engine load is still small, it is determined whether or not the engine load is not changed (Step S206). If the decision in Step S206 is Yes, it is determined again whether or not the current operating state detected in Step S204 fulfills the fault diagnosis execution conditions (Step S207).

If the decision in Step S207 is No, the flag $F_{FD}$ is set at "0" which indicates that no fault diagnosis is being executed (Step S208), and the count value $T_2$ is set at $T_P$ (Step S209). If the decision in Step S207 is Yes, on the other hand, it is determined whether or not the value of the flag $F_{FD}$ is "1" which indicates that the fault diagnosis is being executed (Step S210). Since the decision in Step S210 is No immediately after the fulfillment of the fault diagnosis execution conditions, Steps S112 to S122 of FIG. 10 are executed in succession.

In brief, an average $I_{AVE}$ of the values of the integral term I for the air-fuel ratio feedback control is calculated as a first integral value $I_{A1}$, the position $P_V$ of the ISC valve 8 is read as a first position $P_1$, and the engine speed $N_E$ is calculated as a first speed $N_1$. Further, the second timer for indicating the time period having elapsed since the start of the purge air introduction is restarted, the flag $F_{FD}$ is set at "1" which indicates that the fault diagnosis is being executed, and the purge control valve 46 is energized. In consequence, purge air introduction for fault diagnosis is started normally.

Since the decision in Step S210 is Yes in the next control cycle, Steps S124 to S140 of FIG. 11 are executed.

In brief, when the predetermined value $T_D$ is attained by the count value $T_1$ in the second timer, an average $I_{AVE}$ of the values of the integral term I is calculated as a second integral value $I_{A2}$, the position $P_V$ of the ISC valve 8 is read as a second position $P_2$, and the engine speed $N_E$ is read as a second speed $N_2$. Also, if the absolute value $(|I_{A1}-I_{A2}|)$ of the deviation between the first and second integral values $I_{A1}$ and $I_{A2}$ is smaller than the threshold value $TH_I$, it is determined whether or not the deviation $(P_1-P_2)$ between the first and second positions $P_1$ and $P_2$ is smaller than the threshold value $TH_P$. If the resulting decision is Yes, it is further determined whether or not the deviation $(N_2-N_1)$ between the second and first speeds $N_2$ and $N_1$ is smaller than the threshold value $TH_N$.

If the absolute value $(|I_{A1}-I_{A2}|)$, deviation $(P_1-P_2)$, and deviation $(N_2-N_1)$ are smaller than the threshold values $TH_I$, $TH_P$ and $TH_N$, respectively, that is, if no change of the operating state attributable to the purge air introduction for fault diagnosis is detected, the faulty-state processing subroutine shown in FIG. 12 is executed. If the change of the operating state attributable to the purge air introduction is detected, on the other hand, the normal-state processing subroutine shown in FIG. 6 is executed. Since the faulty- and normal-state processing subroutines have already been described, a further description of those subroutines is omitted.

According to the present embodiment, as described above, the fault diagnosis is interrupted if the external engine load is changed during the fault diagnosis or if the fault diagnosis execution conditions are not fulfilled by the operating state. Thus, an erroneous diagnosis can be securely prevented from being caused by an excessive engine load, change of the engine load, etc. Moreover, the execution of a substantial fault diagnosis is interrupted during the standby time after the point of time when the fault diagnosis is interrupted. In consequence, an erroneous diagnosis can be securely avoided when the engine is excessively loaded or at the time of garaging or night drive in which the engine load and operating conditions are liable to change. Also, the fault diagnosis intervals are sufficiently long, and the comfortableness to drive or drivability of the vehicle can be prevented from being worsened by frequent repetition of the execution and interruption of the purge air introduction.

The fault diagnosis apparatus of the present invention may be modified variously.

According to the first to third embodiments described above, for example, the purge control valve is subjected to the fault diagnosis on the basis of the three operating states before and after the purge air introduction. Alternatively, however, the fault diagnosis may be made in accordance with two or less or four or more operating states. Moreover, the fault diagnosis may be made in accordance with the change of the operating state after temporarily suspending the purge air introduction in the case where the purge air is introduced continuously.

Although the interruption of the fault diagnosis is decided on the basis of the magnitude of the three internal engine loads and the change of the four external engine loads according to the third embodiment, the combinations of these loads can be changed as required. According to the third embodiment, moreover, the alternator is used as an electrical load. Alternatively, however, the fault diagnosis may be interrupted after detecting the change of the operating states of any other electrical loads, such as lamps including head lamps and tail lamps, power window system, defogger, etc.

It is to be understood that the present invention is not limited to the embodiments described above, and that various changes and modifications may be effected therein by one skilled in the art without departing from the scope of the invention as set forth in the appended claims.

What is claimed is:

1. A fault diagnosis apparatus for detecting a fault in a fuel evaporative emission suppressing system which includes a purge passage, through which a fuel evaporative gas in a fuel supply system of an engine mounted in a vehicle, along with outside air, is introduced as purge air into an intake passage of the engine, and purge regulating means for changing a quantity of purge air introduction, comprising:

operating state change detecting means for detecting a change of an operating state of at least one of the vehicle, the engine, and means associated with engine operation when the purge regulating means is driven; and fault diagnosis means for making a fault diagnosis on the fuel evaporative emission suppressing system in accordance with the change of the operating state detected by said operating state change detecting means.

2. A fault diagnosis apparatus according to claim 1, wherein:

said fault diagnosis apparatus is provided in the fuel evaporative emission suppressing system attached to the engine which has, in the intake passage thereof, intake air quantity regulating means for adjusting a quantity of air sucked into the engine, thereby keeping an engine speed constant; and said operating state change detecting means detects a change of a manipulated variable of said intake air quantity regulating means as the operating state change.

3. A fault diagnosis apparatus according to claim 1, wherein said operating state change detecting means detects a change of an engine speed itself as the operating state change.

4. A fault diagnosis apparatus according to claim 1, wherein:

said fault diagnosis apparatus is provided in the fuel evaporative emission suppressing system attached to the engine which includes air-fuel ratio detecting means for detecting an air-fuel ratio of an air-fuel mixture supplied to the engine, control correction value setting means for setting a control correction value for air-fuel ratio feedback control in accordance with a result of the detection by said air-fuel ratio detecting means, fuel supply regulating means for adjusting a quantity of fuel supply to the engine, and fuel control means for drivingly controlling said fuel supply regulating means in accordance with the control correction value set by said control correction value setting means;

said operating state change detecting means detects the control correction value set by said control correction value setting means; and said fault diagnosis means includes first fault diagnosis sub-means for making a fault diagnosis on the fuel evaporative emission suppressing system in accordance with a change of the control correction value caused when the purge regulating means is driven.

5. A fault diagnosis apparatus according to claim 4, wherein said first fault diagnosis sub-means concludes that the fuel evaporative emission suppressing system is faulty when a deviation between a control correction value detected before said purge regulating means is driven and a control correction value detected while said purge regulating means is being driven is smaller than a predetermined value.

6. A fault diagnosis apparatus according to claim 5, wherein said first fault diagnosis sub-means makes a fault diagnosis on the fuel evaporative emission suppressing system in accordance with an average of control correction values obtained from control correction values detected individually before said purge regulating means is driven and an average of control correction values obtained from control correction values detected individually while said purge regulating means is being driven.

7. A fault diagnosis apparatus according to claim 4, 5 or 6, wherein:

said fault diagnosis apparatus is provided in the fuel evaporative emission suppressing system attached to the engine which has, in the intake passage thereof, intake air quantity regulating means for adjusting a quantity of air sucked into the engine, thereby keeping an engine speed constant;

said operating state change detecting means detects a change of a manipulated variable of said intake air quantity regulating means as the operating state change;

said fault diagnosis means includes second fault diagnosis sub-means for making a fault diagnosis on the fuel evaporative emission suppressing system in accordance with the change of the manipulated variable of said intake air quantity regulating means; and said fault diagnosis means finally concludes that the fuel evaporative emission suppressing system is faulty only when both said first and second fault diagnosis sub-means detect a fault in the fuel evaporative emission suppressing system.

8. A fault diagnosis apparatus according to claim 4, 5 or 6, wherein:

said operating state change detecting means detects a change of an engine speed itself as the operating state change;

said fault diagnosis means includes second fault diagnosis sub- means for making a fault diagnosis on the fuel evaporative emission suppressing system in accordance with the change of the engine speed; and said fault diagnosis means finally concludes that the fuel evaporative emission suppressing system is faulty only when both said first and second fault diagnosis submeans detect a fault in the fuel evaporative emission suppressing system.

9. A fault diagnosis apparatus for detecting a fault in a fuel evaporative emission suppressing system which includes a purge passage, through which a fuel evaporative gas in a fuel supply system of an engine mounted in a vehicle, along with outside air, is introduced as purge air into an intake passage of the engine, and purge regulating means for changing a quantity of purge air introduction, comprising:

operating state detecting means for detecting an operating state of at least one of the vehicle, the engine, and means associated with engine operation;

diagnosis means for making a fault diagnosis on the fuel evaporative emission suppressing system in accordance with the change of the operating state of the at least one of the vehicle, the engine, and the means associated with engine operation when said purge regulating means is driven; and diagnosis prohibiting means adapted to interrupt the diagnosis by said diagnosis means when the operating state detected by said operating state detecting means fulfills a predetermined diagnosis interruption condition while said diagnosis means is making the diagnosis and to prohibit said diagnosis means from starting the diagnosis during a predetermined time period after interruption of the diagnosis.

10. A fault diagnosis apparatus according to claim 9, wherein:

said fault diagnosis apparatus is provided in the fuel evaporative emission suppressing system attached to the engine which has, in the intake passage thereof, intake air quantity regulating means for adjusting a quantity of air sucked into the engine, thereby keeping an engine speed constant;

said purge regulating means includes a purge regulating valve provided in the purge passage and adapted to open and close, thereby adjusting a flow rate of the purge air;

said diagnosis means includes manipulated variable detecting means for detecting a manipulated variable of said intake air quantity regulating means; and said diagnosis means makes a fault diagnosis on the fuel evaporative emission suppressing system in accordance with a change of the manipulated variable obtained from manipulated variable values detected by said manipulated variable detecting means when said purge regulating valve is driven so as to be opened and closed, individually.

11. A fault diagnosis apparatus according to claim 9, wherein said diagnosis means prohibits start of a new diagnosis during a predetermined time period after detection of a fault in a case where it is concluded that the fuel evaporative emission suppressing system is faulty.

12. A fault diagnosis apparatus for detecting a fault in a fuel evaporative emission suppressing system which includes a purge passage, through which a fuel evaporative gas in a fuel supply system of an engine mounted in a vehicle, along with outside air, is introduced as purge air into an intake passage of the engine, and purge regulating means for changing a quantity of purge air introduction, comprising:

diagnosis means for making a fault diagnosis on the fuel evaporative emission suppressing system in accordance with a change of an operating state of at least one of the vehicle, the engine, and means associated with engine operation when the purge regulating means is driven;

load detecting means for detecting an engine load; and diagnosis interrupting means for interrupting the fault diagnosis by said diagnosis means when a predetermined loaded state of the engine is detected by said load detecting means.

13. A fault diagnosis apparatus according to claim 12, wherein said load detecting means detects an intake air quantity for each intake stroke of the engine as the engine load.

14. A fault diagnosis apparatus according to claim 12, wherein said load detecting means detects a volumetric efficiency of the engine as the engine load.

15. A fault diagnosis apparatus according to claim 12, wherein said load detecting means detects a manipulated variable of a suction system attached to the engine as the engine load.

16. A fault diagnosis apparatus according to claim 12, wherein:

said load detecting means detects a value of the engine load; and said diagnosis interrupting means interrupts the fault diagnosis by said diagnosis means when the value of the engine load detected by said load detecting means is greater than a predetermined value.

17. A fault diagnosis apparatus according to claim 12, wherein:

said load detecting means detects a change of the engine load; and said diagnosis interrupting means interrupts the fault diagnosis by said diagnosis means when the change of the engine load is detected by said load detecting means.

18. A fault diagnosis apparatus according to claim 17, wherein:

said load detecting means detects presence/absence of changeover of speed range of an automatic transmission provided in the vehicle; and said diagnosis interrupting means interrupts the fault diagnosis by said diagnosis means when changeover between a non-running range and a running range is detected by said load detecting means.

19. A fault diagnosis apparatus according to claim 17, wherein:

said load detecting means detects presence/absence of a change of an operating state of an air conditioner provided in the vehicle; and said diagnosis interrupting means interrupts the fault diagnosis by said diagnosis means when start or interruption of an operation of the air conditioner is detected by said load detecting means.

20. A fault diagnosis apparatus according to claim 17, wherein:

said load detecting means detects presence/absence of a change of an operating state of an electrical load provided in the vehicle; and said diagnosis interrupting means interrupts the fault diagnosis by said diagnosis means when the change of the operating state of the electrical load is detected by said load detecting means.

21. A fault diagnosis apparatus according to claim 17, wherein:

said load detecting means detects presence/absence of a change of a discharge pressure of an engine-operated hydraulic pump of a power steering system provided in the vehicle; and said diagnosis interrupting means interrupts the fault diagnosis by said diagnosis means when the change of the discharge pressure of the hydraulic pump is detected by said load detecting means.

22. A fault diagnosis apparatus according to claim 12, wherein:

said fault diagnosis apparatus is provided in the fuel evaporative emission suppressing system attached to the engine which has air-fuel ratio control means for keeping an air-fuel ratio of an air-fuel mixture supplied to the engine at a predetermined value;

said purge regulating means includes a purge regulating valve provided in the purge passage and adapted to open and close, thereby adjusting a flow rate of the purge air;

said diagnosis means includes correction value detecting means for detecting a correction value of the air-fuel ratio corrected by said air-fuel ratio control means; and said diagnosis means makes a fault diagnosis in accordance with a change of the correction value obtained from correction values detected by said correction value detecting means when said purge regulating valve is driven so as to be opened and closed, individually.

23. A fault diagnosis apparatus according to claim 12, wherein:

said fault diagnosis apparatus is provided in the fuel evaporative emission suppressing system attached to the engine which has, in the intake passage thereof, intake air quantity regulating means for adjusting a quantity of air sucked into the engine, thereby keeping an engine speed constant;

said purge regulating means includes a purge regulating valve provided in the purge passage and adapted to open and close, thereby adjusting a flow rate of the purge air;

said diagnosis means includes manipulated variable detecting means for detecting a manipulated variable of said intake air quantity regulating means; and said diagnosis means makes a fault diagnosis in accordance with the change of a manipulated variable obtained from manipulated variable values detected by said manipulated variable detecting means when said purge regulating valve is driven so as to be opened and closed, individually.

24. A fault diagnosis apparatus according to claim 12, wherein:

said purge regulating means includes a purge regulating valve provided in the purge passage and adapted to open and close, thereby adjusting a flow rate of the purge air;

said diagnosis means includes engine speed detecting means for detecting an engine speed; and said diagnosis means makes a fault diagnosis in accordance with a change of the engine speed obtained from engine speeds detected by said engine speed detecting means when said purge regulating valve is driven so as to be opened and closed, individually.

25. A fault diagnosis apparatus according to claim 12, wherein said diagnosis interrupting means prohibits the diagnosis means from starting the fault diagnosis during a predetermined time period after interruption of the diagnosis.

* * * * *